(12) United States Patent
Gass et al.

(10) Patent No.: US 8,065,943 B2
(45) Date of Patent: Nov. 29, 2011

(54) TRANSLATION STOP FOR USE IN POWER EQUIPMENT

(75) Inventors: Stephen F. Gass, Wilsonville, OR (US); David A. Fanning, Vancouver, WA (US); J. David Fulmer, Tualatin, OR (US); Randall J. Huebner, Beaverton, OR (US)

(73) Assignee: SD3, LLC, Tualatin, OR (US)

( * ) Notice: Subject to any disclaimer, the term of this patent is extended or adjusted under 35 U.S.C. 154(b) by 1025 days.

(21) Appl. No.: 11/256,757

(22) Filed: Oct. 24, 2005

(65) Prior Publication Data

US 2006/0032352 A1 Feb. 16, 2006

Related U.S. Application Data

(63) Continuation of application No. 09/955,418, filed on Sep. 17, 2001, now Pat. No. 6,957,601.

(60) Provisional application No. 60/233,459, filed on Sep. 18, 2000, provisional application No. 60/292,081, filed on May 17, 2001.

(51) Int. Cl.
*B26D 1/00* (2006.01)
*B26D 3/00* (2006.01)
*B26D 5/00* (2006.01)

(52) U.S. Cl. ............................... 83/62; 83/13

(58) Field of Classification Search .............. 83/62, 13
See application file for complete search history.

(56) References Cited

U.S. PATENT DOCUMENTS

| | | |
|---|---|---|
| 146,886 A | 1/1874 | Doane et al. |
| 162,814 A | 5/1875 | Graves et al. |
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |

(Continued)

FOREIGN PATENT DOCUMENTS

CH 297525 6/1954

(Continued)

OTHER PUBLICATIONS

Skil Model 3400-Type 1 10 Table Saw Parts List and Technical Bulletin, S-B Power Tool Company, Jun. 1993.

(Continued)

*Primary Examiner* — Ghassem Alie
*Assistant Examiner* — Bharat C Patel

(57) ABSTRACT

Woodworking machines are disclosed having a blade adapted to cut workpieces, and an actuating mechanism operable to move the blade toward the workpiece. The machines also include a detection system configured to detect one or more dangerous conditions between a user and the blade, and a reaction system configured to stop the movement of the blade toward the user upon detection of a dangerous condition by the detection system.

13 Claims, 12 Drawing Sheets

U.S. PATENT DOCUMENTS

| | | |
|---|---|---|
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Drummond |
| 2,020,222 A | 11/1935 | Tautz |
| 2,038,810 A | 4/1936 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 11/1948 | McWhirter et al. |
| 2,466,325 A | 4/1949 | Ocenasek |
| 2,496,613 A | 2/1950 | Wooward |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr |
| 2,786,496 A | 3/1957 | Eschenburg |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |
| 2,913,025 A | 11/1959 | Richards |
| 2,913,581 A | 11/1959 | Simonton et al. |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |
| 3,047,116 A | 7/1962 | Stiebel et al. |
| 3,085,602 A | 4/1963 | Gaskell |
| 3,105,530 A | 10/1963 | Peterson |
| 3,129,731 A | 4/1964 | Tyrrell |
| 3,163,732 A | 12/1964 | Abbott |
| 3,184,001 A | 5/1965 | Reinsch et al. |
| 3,186,256 A | 6/1965 | Reznick |
| 3,207,273 A | 9/1965 | Jurin |
| 3,213,731 A | 10/1965 | Renard |
| 3,224,474 A | 12/1965 | Bloom |
| 3,232,326 A | 2/1966 | Speer et al. |
| 3,246,205 A | 4/1966 | Miller |
| 3,249,134 A | 5/1966 | Vogl et al. |
| 3,276,497 A | 10/1966 | Heer |
| 3,306,149 A | 2/1967 | John |
| 3,313,185 A | 4/1967 | Drake et al. |
| 3,315,715 A | 4/1967 | Mytinger |
| 3,323,814 A | 6/1967 | Phillips |
| 3,337,008 A | 8/1967 | Trachte |
| 3,356,111 A | 12/1967 | Mitchell |
| 3,386,322 A | 6/1968 | Stone et al. |
| 3,439,183 A | 4/1969 | Hurst, Jr |
| 3,445,835 A | 5/1969 | Fudaley |
| 3,454,286 A | 7/1969 | Anderson et al. |
| 3,456,696 A | 7/1969 | Gregory et al. |
| 3,463,919 A * | 8/1969 | Da Rold et al. ........ 246/182 BH |
| 3,512,440 A | 5/1970 | Frydmann |
| 3,538,964 A | 11/1970 | Warrick et al. |
| 3,540,338 A | 11/1970 | McEwan et al. |

| | | | | | | |
|---|---|---|---|---|---|---|
| 3,554,067 A | 1/1971 | Scutella | | 4,276,799 A | 7/1981 | Muehling |
| 3,566,996 A | 3/1971 | Crossman | | 4,291,794 A | 9/1981 | Bauer |
| 3,580,376 A | 5/1971 | Loshbough | | 4,305,442 A | 12/1981 | Currie |
| 3,581,784 A | 6/1971 | Warrick | | 4,321,841 A | 3/1982 | Felix |
| 3,593,266 A | 7/1971 | Van Sickle | | 4,372,202 A | 2/1983 | Cameron |
| 3,613,748 A | 10/1971 | De Pue | | 4,391,358 A | 7/1983 | Haeger |
| 3,621,894 A | 11/1971 | Niksich | | 4,418,597 A | 12/1983 | Krusemark et al. |
| 3,670,788 A | 6/1972 | Pollak et al. | | 4,427,042 A | 1/1984 | Mitchell et al. |
| 3,675,444 A | 7/1972 | Whipple | | 4,466,170 A | 8/1984 | Davis |
| 3,680,609 A | 8/1972 | Menge | | 4,466,233 A | 8/1984 | Thesman |
| 3,688,815 A | 9/1972 | Ridenour | | 4,470,046 A | 9/1984 | Betsill |
| 3,695,116 A | 10/1972 | Baur | | 4,510,489 A | 4/1985 | Anderson, III et al. |
| 3,696,844 A | 10/1972 | Bernatschek | | 4,512,224 A | 4/1985 | Terauchi |
| 3,716,113 A | 2/1973 | Kobayashi et al. | | 4,518,043 A | 5/1985 | Anderson et al. |
| 3,719,103 A | 3/1973 | Streander | | 4,532,501 A | 7/1985 | Hoffman |
| 3,745,546 A | 7/1973 | Struger et al. | | 4,532,844 A | 8/1985 | Chang et al. |
| 3,749,933 A | 7/1973 | Davidson | | 4,557,168 A | 12/1985 | Tokiwa |
| 3,754,493 A | 8/1973 | Niehaus et al. | | 4,559,858 A | 12/1985 | Laskowski et al. |
| 3,772,590 A | 11/1973 | Mikulecky et al. | | 4,560,033 A | 12/1985 | DeWoody et al. |
| 3,785,230 A | 1/1974 | Lokey | | 4,566,512 A | 1/1986 | Wilson |
| 3,793,915 A | 2/1974 | Hujer | | 4,573,556 A | 3/1986 | Andreasson |
| 3,805,639 A | 4/1974 | Peter | | 4,576,073 A | 3/1986 | Stinson |
| 3,805,658 A | 4/1974 | Scott et al. | | 4,589,047 A | 5/1986 | Gaus et al. |
| 3,808,932 A | 5/1974 | Russell | | 4,589,860 A | 5/1986 | Brandenstein et al. |
| 3,829,850 A | 8/1974 | Guetersloh | | 4,599,597 A | 7/1986 | Rotbart |
| 3,829,970 A | 8/1974 | Anderson | | 4,599,927 A | 7/1986 | Eccardt et al. |
| 3,858,095 A * | 12/1974 | Friemann et al. ......... 192/129 A | | 4,606,251 A | 8/1986 | Boileau |
| 3,861,016 A | 1/1975 | Johnson et al. | | 4,615,247 A | 10/1986 | Berkeley |
| 3,863,208 A | 1/1975 | Balban | | 4,621,300 A | 11/1986 | Summerer |
| 3,880,032 A | 4/1975 | Green | | 4,625,604 A | 12/1986 | Handler et al. |
| 3,882,744 A | 5/1975 | McCarroll | | 4,637,188 A | 1/1987 | Crothers |
| 3,886,413 A | 5/1975 | Dow et al. | | 4,637,289 A * | 1/1987 | Ramsden ........................ 83/380 |
| 3,889,567 A | 6/1975 | Sato et al. | | 4,644,832 A | 2/1987 | Smith |
| 3,922,785 A | 12/1975 | Fushiya | | 4,653,189 A | 3/1987 | Andreasson |
| 3,924,688 A | 12/1975 | Cooper et al. | | 4,657,428 A | 4/1987 | Wiley |
| 3,931,727 A | 1/1976 | Luenser | | 4,672,500 A | 6/1987 | Tholome et al. |
| 3,935,777 A | 2/1976 | Bassett | | 4,675,664 A | 6/1987 | Cloutier et al. |
| 3,945,286 A | 3/1976 | Smith | | 4,679,719 A | 7/1987 | Kramer |
| 3,946,631 A * | 3/1976 | Malm .............................. 83/380 | | 4,706,195 A * | 11/1987 | Yoshino et al. .................. 701/96 |
| 3,947,734 A | 3/1976 | Fyler | | 4,722,021 A | 1/1988 | Hornung et al. |
| 3,949,636 A | 4/1976 | Ball et al. | | 4,751,603 A | 6/1988 | Kwan |
| 3,953,770 A | 4/1976 | Hayashi | | 4,756,220 A | 7/1988 | Olsen et al. |
| 3,960,310 A | 6/1976 | Nussbaum | | 4,757,881 A | 7/1988 | Jonsson et al. |
| 3,967,161 A | 6/1976 | Lichtblau | | 4,774,866 A | 10/1988 | Dehari et al. |
| 3,974,565 A | 8/1976 | Ellis | | 4,792,965 A | 12/1988 | Morgan |
| 3,975,600 A | 8/1976 | Marston | | 4,805,504 A | 2/1989 | Fushiya et al. |
| 3,978,624 A | 9/1976 | Merkel et al. | | 4,831,279 A | 5/1989 | Ingraham |
| 3,994,192 A | 11/1976 | Faig | | 4,840,135 A | 6/1989 | Yamauchi |
| 4,007,679 A | 2/1977 | Edwards | | 4,845,476 A | 7/1989 | Rangeard et al. |
| 4,016,490 A | 4/1977 | Weckenmann et al. | | 4,864,455 A | 9/1989 | Shimomura et al. |
| 4,026,174 A | 5/1977 | Fierro | | 4,875,398 A | 10/1989 | Taylor et al. |
| 4,026,177 A | 5/1977 | Lokey | | 4,896,607 A | 1/1990 | Hall et al. |
| 4,029,159 A | 6/1977 | Nymann | | 4,906,962 A | 3/1990 | Duimstra |
| 4,047,156 A | 9/1977 | Atkins | | 4,907,679 A | 3/1990 | Menke |
| 4,048,886 A | 9/1977 | Zettler | | 4,934,233 A | 6/1990 | Brundage et al. |
| 4,060,160 A | 11/1977 | Lieber | | 4,936,876 A | 6/1990 | Reyes |
| 4,070,940 A | 1/1978 | McDaniel et al. | | 4,937,554 A | 6/1990 | Herman |
| 4,075,961 A | 2/1978 | Harris | | 4,964,450 A | 10/1990 | Hughes et al. |
| 4,077,161 A * | 3/1978 | Wyle et al. ..................... 451/231 | | 4,965,909 A | 10/1990 | McCullough et al. |
| 4,085,303 A | 4/1978 | McIntyre et al. | | 4,975,798 A | 12/1990 | Edwards et al. |
| 4,090,345 A | 5/1978 | Harkness | | 5,020,406 A | 6/1991 | Sasaki et al. |
| 4,091,698 A | 5/1978 | Obear et al. | | 5,025,175 A * | 6/1991 | Dubois, III ................... 307/326 |
| 4,106,378 A | 8/1978 | Kaiser | | 5,042,348 A | 8/1991 | Brundage et al. |
| 4,117,752 A * | 10/1978 | Yoneda .............................. 83/58 | | 5,046,426 A | 9/1991 | Julien et al. |
| 4,145,940 A | 3/1979 | Woloveke et al. | | 5,052,255 A | 10/1991 | Gaines |
| 4,152,833 A | 5/1979 | Phillips | | 5,074,047 A | 12/1991 | King |
| 4,161,649 A | 7/1979 | Klos et al. | | 5,081,406 A | 1/1992 | Hughes et al. |
| 4,175,452 A | 11/1979 | Idel | | 5,082,316 A | 1/1992 | Wardlaw |
| 4,190,000 A | 2/1980 | Shaull et al. | | 5,083,973 A | 1/1992 | Townsend |
| 4,195,722 A | 4/1980 | Anderson et al. | | 5,086,890 A | 2/1992 | Turczyn et al. |
| 4,199,930 A | 4/1980 | Lebet et al. | | 5,094,000 A | 3/1992 | Becht et al. |
| 4,206,666 A | 6/1980 | Ashton | | 5,116,249 A | 5/1992 | Shiotani et al. |
| 4,206,910 A | 6/1980 | Biesemeyer | | 5,119,555 A | 6/1992 | Johnson |
| 4,249,117 A | 2/1981 | Leukhardt et al. | | 5,122,091 A | 6/1992 | Townsend |
| 4,249,442 A | 2/1981 | Fittery | | 5,174,349 A | 12/1992 | Svetlik et al. |
| 4,262,278 A | 4/1981 | Howard et al. | | 5,184,534 A | 2/1993 | Lee |
| 4,267,914 A | 5/1981 | Saar | | 5,198,702 A | 3/1993 | McCullough et al. |
| 4,270,427 A | 6/1981 | Colberg et al. | | 5,199,343 A | 4/1993 | O'Banion |
| 4,276,459 A | 6/1981 | Willett et al. | | 5,201,110 A | 4/1993 | Bane |

| | | | | | | |
|---|---|---|---|---|---|---|
| 5,201,684 A | 4/1993 | DeBois, III | | 5,989,116 A | 11/1999 | Johnson et al. |
| 5,206,625 A | 4/1993 | Davis | | 6,009,782 A | 1/2000 | Tajima et al. |
| 5,207,253 A | 5/1993 | Hoshino et al. | | 6,018,284 A | 1/2000 | Rival et al. |
| 5,212,621 A | 5/1993 | Panter | | 6,037,729 A | 3/2000 | Woods et al. |
| 5,218,189 A | 6/1993 | Hutchison | | D422,290 S | 4/2000 | Welsh et al. |
| 5,231,359 A | 7/1993 | Masuda et al. | | 6,052,884 A | 4/2000 | Steckler et al. |
| 5,231,906 A | 8/1993 | Kogej | | 6,062,121 A | 5/2000 | Ceroll et al. |
| 5,239,978 A | 8/1993 | Plangetis | | 6,070,484 A | 6/2000 | Sakamaki |
| 5,245,879 A | 9/1993 | McKeon | | 6,095,092 A | 8/2000 | Chou |
| 5,257,570 A | 11/1993 | Shiotani et al. | | 6,112,785 A | 9/2000 | Yu |
| 5,265,510 A | 11/1993 | Hoyer-Ellefsen | | 6,119,984 A | 9/2000 | Devine |
| 5,272,946 A | 12/1993 | McCullough et al. | | 6,131,629 A | 10/2000 | Puzio et al. |
| 5,276,431 A | 1/1994 | Piccoli et al. | | 6,133,818 A | 10/2000 | Hsieh et al. |
| 5,285,708 A | 2/1994 | Bosten et al. | | 6,141,192 A | 10/2000 | Garzon |
| 5,293,802 A | 3/1994 | Shiotani et al. | | 6,148,504 A | 11/2000 | Schmidt et al. |
| 5,320,382 A | 6/1994 | Goldstein et al. | | 6,148,703 A | 11/2000 | Ceroll et al. |
| 5,321,230 A | 6/1994 | Shanklin et al. | | 6,150,826 A | 11/2000 | Hokodate et al. |
| 5,331,875 A | 7/1994 | Mayfield | | 6,161,459 A | 12/2000 | Ceroll et al. |
| 5,353,670 A | 10/1994 | Metzger, Jr. | | 6,170,370 B1 | 1/2001 | Sommerville |
| 5,377,554 A | 1/1995 | Reulein et al. | | 6,244,149 B1 | 6/2001 | Ceroll et al. |
| 5,377,571 A | 1/1995 | Josephs | | 6,250,190 B1 | 6/2001 | Ceroll et al. |
| 5,392,568 A | 2/1995 | Howard, Jr. et al. | | 6,257,061 B1 | 7/2001 | Nonoyama et al. |
| 5,392,678 A | 2/1995 | Sasaki et al. | | 6,325,195 B1 | 12/2001 | Doherty |
| 5,401,928 A | 3/1995 | Kelley | | 6,330,848 B1 | 12/2001 | Nishio et al. |
| 5,411,221 A | 5/1995 | Collins et al. | | 6,336,273 B1 | 1/2002 | Nilsson et al. |
| 5,423,232 A | 6/1995 | Miller et al. | | 6,352,137 B1 | 3/2002 | Stegall et al. |
| 5,436,613 A | 7/1995 | Ghosh et al. | | 6,357,328 B1 | 3/2002 | Ceroll et al. |
| 5,447,085 A | 9/1995 | Gochnauer | | 6,366,099 B1 | 4/2002 | Reddi |
| 5,451,750 A | 9/1995 | An | | 6,376,939 B1 | 4/2002 | Suzuki et al. |
| 5,453,903 A | 9/1995 | Chow | | 6,404,098 B1 | 6/2002 | Kayama et al. |
| 5,471,888 A | 12/1995 | McCormick | | 6,405,624 B2 | 6/2002 | Sutton |
| 5,480,009 A | 1/1996 | Wieland et al. | | 6,418,829 B1 * | 7/2002 | Pilchowski ..................... 83/397 |
| 5,503,059 A | 4/1996 | Pacholok | | 6,420,814 B1 | 7/2002 | Bobbio |
| 5,510,587 A | 4/1996 | Reiter | | 6,427,570 B1 | 8/2002 | Miller et al. |
| 5,510,685 A | 4/1996 | Grasselli | | 6,430,007 B1 | 8/2002 | Jabbari |
| 5,513,548 A | 5/1996 | Garuglieri | | 6,431,425 B1 | 8/2002 | Moorman et al. |
| 5,531,147 A | 7/1996 | Serban | | 6,450,077 B1 | 9/2002 | Ceroll et al. |
| 5,534,836 A | 7/1996 | Schenkel et al. | | 6,453,786 B1 | 9/2002 | Ceroll et al. |
| 5,572,916 A | 11/1996 | Takano | | 6,460,442 B2 | 10/2002 | Talesky et al. |
| 5,587,618 A | 12/1996 | Hathaway | | 6,471,106 B1 | 10/2002 | Reining |
| 5,592,353 A | 1/1997 | Shinohara et al. | | 6,479,958 B1 | 11/2002 | Thompson et al. |
| 5,606,889 A | 3/1997 | Bielinski et al. | | 6,484,614 B1 | 11/2002 | Huang |
| 5,619,896 A | 4/1997 | Chen | | D466,913 S | 12/2002 | Ceroll et al. |
| 5,623,860 A | 4/1997 | Schoene et al. | | 6,492,802 B1 | 12/2002 | Bielski |
| 5,647,258 A | 7/1997 | Brazell et al. | | D469,354 S | 1/2003 | Curtsinger |
| 5,648,644 A | 7/1997 | Nagel | | 6,502,493 B1 | 1/2003 | Eccardt et al. |
| 5,659,454 A | 8/1997 | Vermesse | | 6,536,536 B1 | 3/2003 | Gass et al. |
| 5,667,152 A | 9/1997 | Mooring | | 6,543,324 B2 | 4/2003 | Dils |
| 5,671,633 A | 9/1997 | Wagner | | 6,546,835 B2 | 4/2003 | Wang |
| 5,695,306 A | 12/1997 | Nygren, Jr. | | 6,564,909 B1 | 5/2003 | Razzano |
| 5,700,165 A | 12/1997 | Harris et al. | | 6,575,067 B2 | 6/2003 | Parks et al. |
| 5,722,308 A | 3/1998 | Ceroll et al. | | 6,578,460 B2 | 6/2003 | Sartori |
| 5,724,847 A * | 3/1998 | Hite ................ 72/285 | | 6,578,856 B2 | 6/2003 | Kahle |
| 5,724,875 A | 3/1998 | Meredith et al. | | 6,581,655 B2 | 6/2003 | Huang |
| 5,730,165 A | 3/1998 | Philipp | | 6,595,096 B2 | 7/2003 | Ceroll et al. |
| 5,741,048 A | 4/1998 | Eccleston | | D478,917 S | 8/2003 | Ceroll et al. |
| 5,755,148 A | 5/1998 | Stumpf et al. | | 6,601,493 B1 | 8/2003 | Crofutt |
| 5,771,742 A | 6/1998 | Bokaie et al. | | 6,607,015 B1 | 8/2003 | Chen |
| 5,782,001 A | 7/1998 | Gray | | D479,538 S | 9/2003 | Welsh et al. |
| 5,787,779 A | 8/1998 | Garuglieri | | 6,617,720 B1 | 9/2003 | Egan, III et al. |
| 5,791,057 A | 8/1998 | Nakamura et al. | | 6,619,348 B2 | 9/2003 | Wang |
| 5,791,223 A | 8/1998 | Lanzer | | 6,640,683 B2 | 11/2003 | Lee |
| 5,791,224 A | 8/1998 | Suzuki et al. | | 6,644,157 B2 | 11/2003 | Huang |
| 5,791,441 A | 8/1998 | Matos et al. | | 6,647,847 B2 | 11/2003 | Hewitt et al. |
| 5,819,619 A | 10/1998 | Miller et al. | | 6,659,233 B2 | 12/2003 | DeVlieg |
| 5,852,951 A | 12/1998 | Santi | | 6,684,750 B2 | 2/2004 | Yu |
| 5,857,507 A | 1/1999 | Puzio et al. | | 6,722,242 B2 | 4/2004 | Chuang |
| 5,861,809 A | 1/1999 | Eckstein et al. | | 6,734,581 B1 | 5/2004 | Griffis |
| 5,875,698 A | 3/1999 | Ceroll et al. | | 6,736,042 B2 | 5/2004 | Behne et al. |
| 5,880,954 A | 3/1999 | Thomson et al. | | 6,742,430 B2 | 6/2004 | Chen |
| 5,921,367 A | 7/1999 | Kashioka et al. | | 6,796,208 B1 | 9/2004 | Jorgensen |
| 5,927,857 A | 7/1999 | Ceroll et al. | | 6,800,819 B2 | 10/2004 | Sato et al. |
| 5,930,096 A | 7/1999 | Kim | | 6,826,988 B2 | 12/2004 | Gass et al. |
| 5,937,720 A | 8/1999 | Itzov | | 6,826,992 B1 | 12/2004 | Huang |
| 5,942,975 A | 8/1999 | Sorensen | | 6,840,144 B2 | 1/2005 | Huang |
| 5,943,932 A | 8/1999 | Sberveglieri | | 6,854,371 B2 | 2/2005 | Yu |
| 5,950,514 A | 9/1999 | Benedict et al. | | 6,857,345 B2 | 2/2005 | Gass et al. |
| 5,963,173 A | 10/1999 | Lian et al. | | 6,874,397 B2 | 4/2005 | Chang |
| 5,974,927 A | 11/1999 | Tsune | | 6,874,399 B2 | 4/2005 | Lee |

| | | |
|---|---|---|
| 6,877,410 B2 | 4/2005 | Gass et al. |
| 6,880,440 B2 | 4/2005 | Gass et al. |
| 6,883,397 B2 | 4/2005 | Kimizuka |
| 6,889,585 B1 * | 5/2005 | Harris et al. ............... 83/62 |
| 6,920,814 B2 | 7/2005 | Gass et al. |
| 6,922,153 B2 | 7/2005 | Pierga et al. |
| 6,945,148 B2 | 9/2005 | Gass et al. |
| 6,945,149 B2 | 9/2005 | Gass et al. |
| 6,957,601 B2 | 10/2005 | Gass et al. |
| 6,968,767 B2 | 11/2005 | Yu |
| 6,986,370 B1 | 1/2006 | Schoene et al. |
| 6,994,004 B2 | 2/2006 | Gass et al. |
| 6,997,090 B2 | 2/2006 | Gass et al. |
| 7,000,514 B2 | 2/2006 | Gass et al. |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020271 A1 | 2/2002 | Gass et al. |
| 2002/0043776 A1 | 4/2002 | Chuang |
| 2002/0050201 A1 | 5/2002 | Lane et al. |
| 2002/0056349 A1 | 5/2002 | Gass et al. |
| 2002/0059853 A1 | 5/2002 | Gass et al. |
| 2002/0059854 A1 | 5/2002 | Gass et al. |
| 2002/0069734 A1 | 6/2002 | Gass et al. |
| 2002/0088325 A1 | 7/2002 | Talesky et al. |
| 2002/0096030 A1 | 7/2002 | Wang |
| 2002/0109036 A1 | 8/2002 | Denen et al. |
| 2002/0134212 A1 | 9/2002 | Ceroll et al. |
| 2002/0170399 A1 | 11/2002 | Gass et al. |
| 2002/0170400 A1 | 11/2002 | Gass |
| 2002/0174755 A1 | 11/2002 | Behne et al. |
| 2002/0190581 A1 | 12/2002 | Gass et al. |
| 2003/0000359 A1 | 1/2003 | Eccardt et al. |
| 2003/0002942 A1 | 1/2003 | Gass et al. |
| 2003/0005588 A1 | 1/2003 | Gass et al. |
| 2003/0015253 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0058121 A1 | 3/2003 | Gass et al. |
| 2003/0074873 A1 | 4/2003 | Freiberg et al. |
| 2003/0089212 A1 | 5/2003 | Parks et al. |
| 2003/0090224 A1 | 5/2003 | Gass et al. |
| 2003/0101857 A1 | 6/2003 | Chuang |
| 2003/0109798 A1 | 6/2003 | Kermani |
| 2003/0131703 A1 | 7/2003 | Gass et al. |
| 2003/0140749 A1 | 7/2003 | Gass et al. |
| 2003/0213349 A1 | 11/2003 | Chang |
| 2004/0011177 A1 | 1/2004 | Huang |
| 2004/0040426 A1 | 3/2004 | Gass et al. |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2004/0255745 A1 | 12/2004 | Peot et al. |
| 2005/0057206 A1 | 3/2005 | Uneyama |
| 2005/0066784 A1 | 3/2005 | Gass |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0274432 A1 | 12/2005 | Gass et al. |
| 2006/0000337 A1 | 1/2006 | Gass |
| 2006/0032352 A1 | 2/2006 | Gass et al. |

FOREIGN PATENT DOCUMENTS

| | | |
|---|---|---|
| DE | 76186 | 8/1921 |
| DE | 2800403 | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |

OTHER PUBLICATIONS

Shop Fox® Fence Operating Manual, Woodstock International, Inc., 1996, revised May 1997.
Gordon Engineering Corp., Product Catalog, pp. cover, 1, 3 and back, Brookfield, Connecticut, US, Oct. 1997.
Analog Devices, Inc., 3-Axis Capacitive Sensor—Preliminary Technical Data AD7103, pp. 1-40, © 1998.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, Jet Equipment & Tools, Mar. 2001.
XACTA Fence II™ Commercial 30/50 Owner's Manual, Jet Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, Jet Equipment & Tools, Jun. 2001.
Skil Model 3400 Table Saw Operating/Safety Instructions, S-B Power Tool Company, Sep. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
Accu-Fence® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
*You Should Have Invented It*, French television show video.
Laguna Tools table saw owner's manual, date unknown.

* cited by examiner

TRANSLATION STOP FOR USE IN POWER EQUIPMENT

CROSS-REFERENCE TO RELATED APPLICATIONS

This application is a continuation of U.S. patent application Ser. No. 09/955,418, filed Sep. 17, 2001, issuing as U.S. Pat. No. 6,957,601 on Oct. 25, 2005, which claims priority to U.S. Provisional Patent Application Ser. No. 60/233,459, filed Sep. 18, 2000 and U.S. Provisional Patent Application Ser. No. 60/292,081, filed May 17, 2001. The disclosure of each of the above applications is hereby incorporated by reference in its entirety for all purposes.

FIELD OF THE INVENTION

The present invention relates to safety systems and more particularly to a safety system that stops translational motion of a cutting tool in power equipment.

BACKGROUND

Power equipment such as miter saws and radial arm saws include circular blades that move down onto or across a workpiece to cut the workpiece. Pneumatic up-cut chop saws often have a blade that rises through a slot in a table to cut a board. The blades, however, present a risk of injury to a user of the equipment as the blades move to make a cut. Accordingly, those saws often include blade guards that physically block an operator from making contact with the blade to minimize the risk of injury. In many cases, guards effectively reduce the risk of injury; however, there are many instances where the nature of the operations to be performed precludes using a guard that completely blocks access to hazardous machine parts. For example, a user of a radial arm saw draws the blade toward him as he cuts a workpiece. The user typically holds the workpiece with one hand while operating the saw with his other hand. In such a situation, the saw blade is at least partially exposed so that the blade can cut the workpiece. While the blade is at least partially exposed, the blade may accidentally contact the user's finger and the user may continue pulling the blade into his finger before he can react. Similarly, in a pneumatic up-cut chop saw, the user may position the material to be cut and accidentally place their hand in the path of the blade. When the saw is actuated the blade rises so quickly that the user does not have time to remove their hand. In some cases, a guard placed above the blade drops down prior to the cut, and the guard may trap the user's hand in the path of the blade.

DETAILED DESCRIPTION

Figure 1:
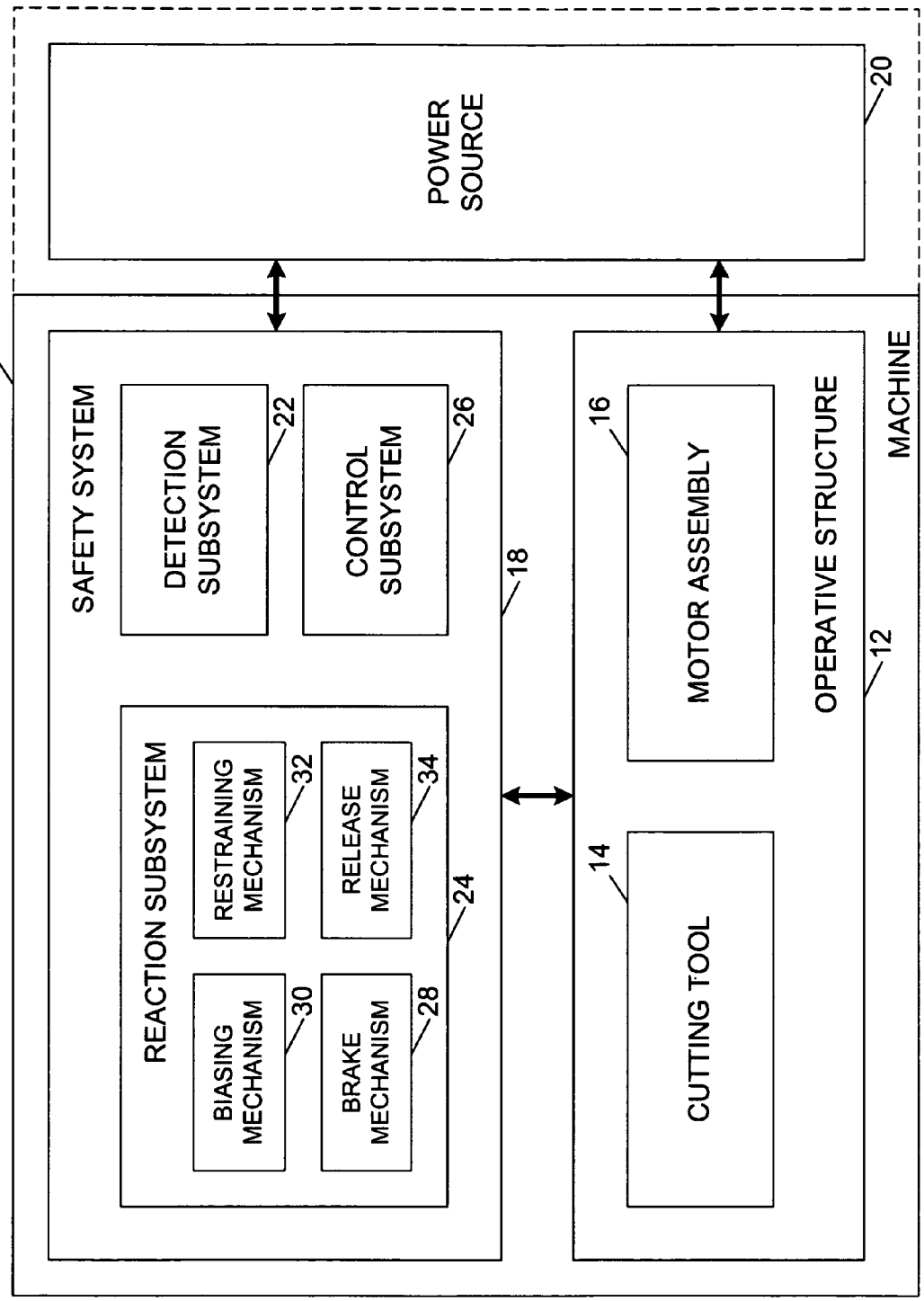
FIG. 1 is a schematic block diagram of a machine with a fast-acting safety system.

A machine according to the present invention is shown schematically in FIG. 1 and indicated generally at 10. Machine 10 may be any of a variety of different types and configurations of machine adapted for cutting workpieces, such as wood, plastic, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous, or triggering, conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14. In the case of chop saws, operative structure 12 typically takes the form of an arbor block pivotally coupled to a base or frame. Cutting tool 14 is mounted on the arm and pivotal upward toward a workpiece supported by the base.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000, the disclosure of which is herein incorporated by reference. Retraction of the cutting tool from its operating position is described in more detail in U.S. Provisional Patent Application Ser. No. 60/225,089, filed Aug. 14, 2000, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
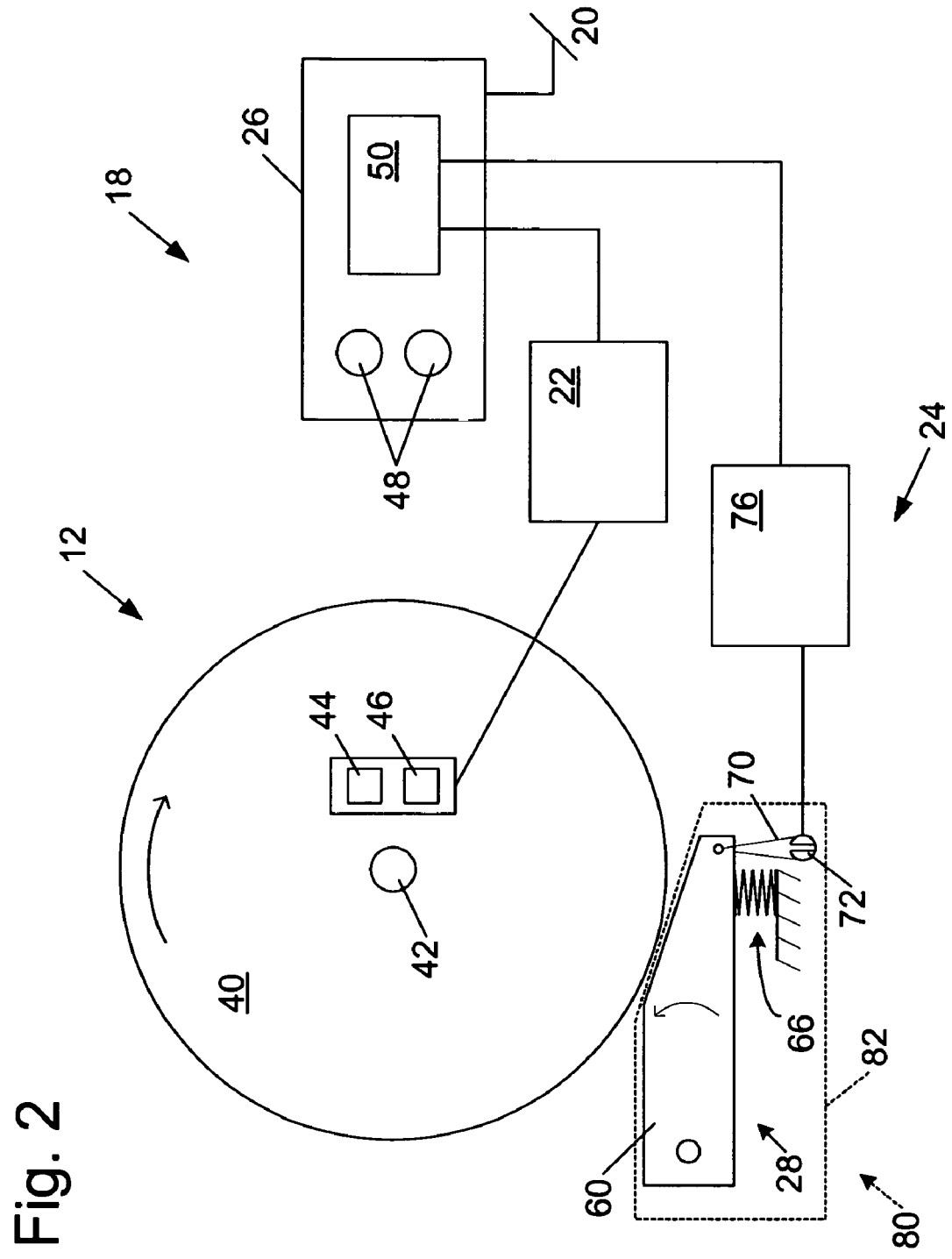
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, brake mechanism 28 is adapted to engage the teeth of blade 40 and stop rotation of the blade.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14, is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, U.S. Provisional Patent Application Ser. No. 60/225,211, filed Aug. 14, 2000, and U.S. Provisional Patent Application Ser. No. 60/270,011, filed Feb. 20, 2001, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000 and U.S. Provisional Patent Application Ser. No. 60/225,094, filed Aug. 14, 2000, the disclosures of which are herein incorporated by reference.

In the exemplary implementation shown in FIG. 2, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultra-high molecular weight polyethylene (UHMW), Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism such as a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism such as a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately 1/32-inch to 1/4-inch from the edge of the blade by fusible member 70; however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, U.S. Provisional Patent Application Ser. No. 60/225,169, filed Aug. 14, 2000, and U.S. Provisional Patent Application Ser. No. 60/225,170, filed Aug. 14, 2000, the disclosures of which are herein incorporated by reference.

It will be appreciated that activation of the brake mechanism may require the replacement of one or more portions of safety system 18. For example, pawl 60 and fusible member 70 typically are single-use components which must be replaced before the safety system is ready to be used again. Thus, it may be desirable to incorporate one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction subsystem has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000 and U.S. Provisional Patent Application Ser. No. 60/225,212, filed Aug. 14, 2000, the disclosures of which are herein incorporated by reference.

In the case of miter saws, chop saws, radial arm saws, and other power equipment in which a cutting tool moves toward and into a workpiece to cut the workpiece, reaction subsystem 24 may include a system to stop the cutting tool from continuing to move into the workpiece. Stopping the translational motion of the cutting tool can minimize any injury from accidental contact between a user and the cutting tool.

Figure 3:
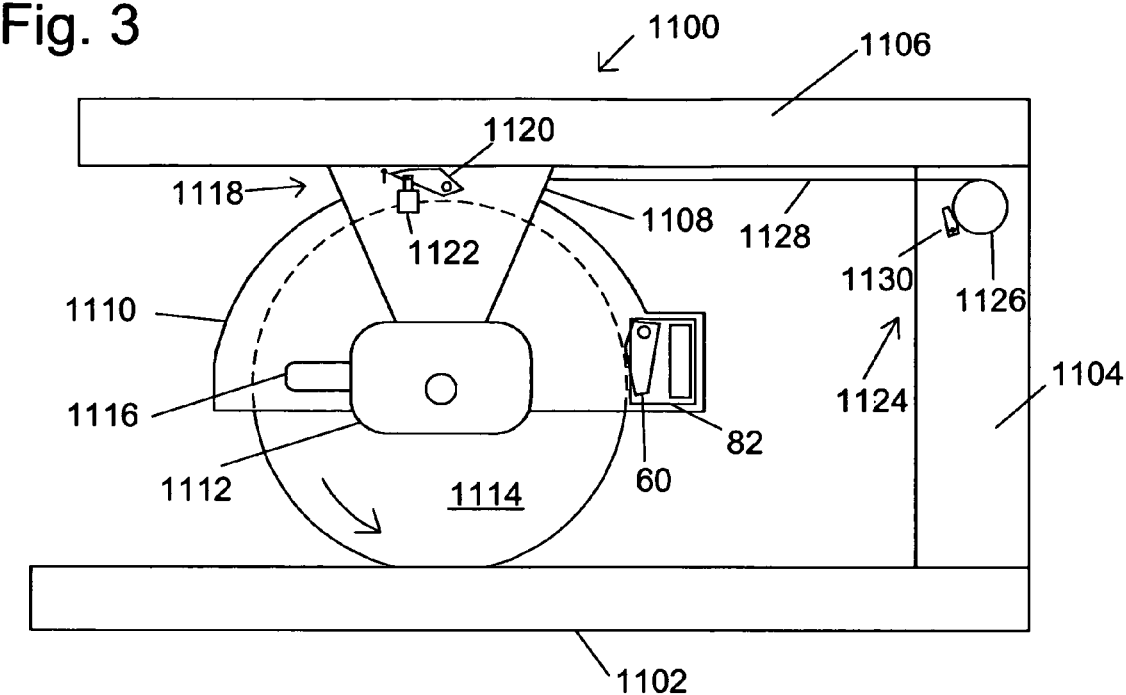
FIG. 3 is a side elevation of a radial arm saw equipped with a safety system.

FIG. 3 illustrates an exemplary implementation of a system to stop the translational motion of a cutting tool in the context of a radial arm saw 1100. Typically, radial arm saw 1100 includes a horizontal base 1102, a vertical support column 1104 extending upward from base 1102, and a guide arm 1106 that extends from column 1104 vertically spaced above base 1102. A carriage 1108 is slidably coupled to the underside of guide arm 1106. The bottom end of carriage 1108 is connected to a saw housing 1110 and to a motor assembly 1112, allowing a blade 1114 to be pulled across the base to cut workpieces (not shown) supported on the base. Radial arm saw 1100 is preferably equipped with a system as described above to stop the spinning of the blade, which includes a brake pawl 60 in a cartridge 80.

In use, a user grasps a handle 1116 on the saw and pulls the saw and blade across a workpiece on base 1102. In so doing, a user may accidentally pull the saw into contact with a misplaced finger or some other part of his body. Upon contact, brake pawl 60 works to stop the blade from spinning, but since the user may be pulling the saw toward his or her body when contact is detected, the saw may continue to move toward the user even after pawl 60 has stopped the blade. This continued movement may cause the stopped blade to be driven over a portion of the user's body (e.g., the user's hand), causing further injury. A system to stop the movement of the carriage and saw along the guide arm once contact is detected between the blade and the user's body addresses this issue.

It will be appreciated that there are a wide variety of ways to stop the sliding movement of carriage 1108 along arm 1106. FIG. 3 illustrates two examples. One example includes a pivoting wedge assembly 1118. Assembly 1118 includes a wedge or pawl 1120 pivotally coupled to carriage 1108. An actuator 1122 mounted on carriage 1108 is operatively coupled to the control and detection subsystems associated with brake pawl 60 and cartridge 80 so that when pawl 60 is released, actuator 1122 engages wedge 1120. During normal operation, actuator 1122 maintains the wedge spaced-apart from guide arm 1106. However, once contact between the blade and the user's body is detected, the detection system sends an actuation signal to actuator 1122. The signal sent to actuator 1122 may be the same signal that triggers the release of brake pawl 60, or it may be a different signal. In any event, upon receipt of the actuation signal, the actuator drives against wedge 1120, causing it to pivot into the guide arm, preventing further movement of the guide bracket forward along the guide arm. The wedge may be constructed or coated with a high friction material such as rubber, and/or may be configured with teeth, etc., to increase its braking action.

The other exemplary braking configuration illustrated in FIG. 3 includes a lockable spool assembly 1124. Assembly 1124 may be used in place of, or in addition to, wedge assembly 1118. In any event, the lockable spool assembly includes a spring-loaded spool 1126 mounted on support column 1104. One end of a tether or cable 1128 is attached to carriage 1108, while the other end is wound around spool 1126. As the user pulls the saw across the base, the spool unwinds, allowing the tether to extend. The spring-loading of the spool ensures that the spool maintains a slight tension on the tether and retracts the tether around the spool when the user pushes the saw back toward the support column. Assembly 1124 also includes a spool brake, such as pawl 1130, operatively coupled to the control and detection systems associated with brake pawl 60. Thus, when contact between the blade and the user's body is detected, an actuation signal is sent to the spool brake, causing the spool to lock. Once the spool locks, the tether prevents further movement of the saw away from support column 1104. In an alternative implementation of spool assembly 1124 not shown in FIG. 3, the lockable spool may be contained in, or placed adjacent to, cartridge 80, in which case the tether would run from the spool backward to support column 1104.

It will be appreciated that there are many alternative methods, devices, and configurations for stopping the travel of the guide bracket and the saw along the guide arm. Any one or more of these alternatives may be used in place of, or in addition to, the braking configurations illustrated in FIG. 3 and described above.

Figure 4:
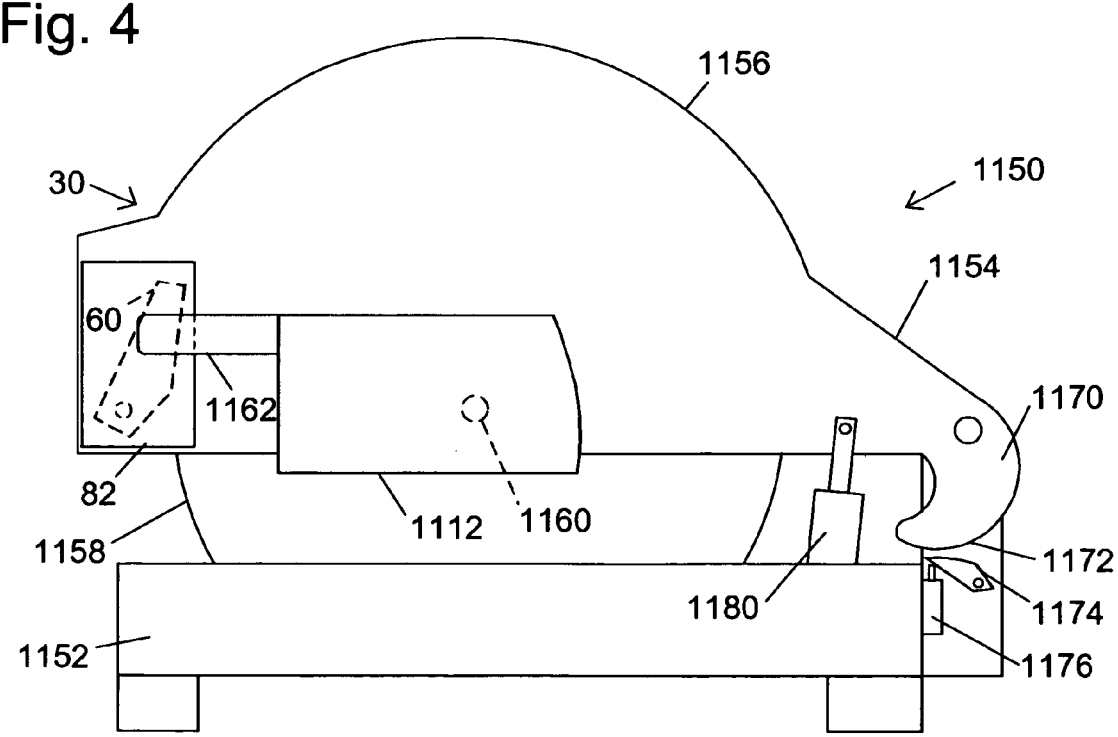
FIG. 4 is a side elevation of a miter saw equipped with a safety system.

FIG. 4 illustrates an exemplary implementation of a system to stop the translational motion of a cutting tool in the context of a miter saw 1150. It will be understood that miter saw 1150 may be any type of miter saw including a simple miter saw, compound miter saw, sliding compound miter saw, etc. Typically, miter saw 1150 includes a base or stand 1152 adapted to hold the workpiece to be cut. A swing arm 1154 is pivotally coupled to base 1152 to allow the arm to pivot downward toward the base. Attached to arm 1154 is a housing 1156 adapted to at least partially enclose a circular blade 1158. A motor assembly 1112 is coupled to the housing, and includes a rotating arbor 1160 on which the blade is mounted. Motor assembly 1112 includes a handle 1162 with a trigger (not shown) operable to run the saw. An optional blade guard (not shown) may extend from the bottom of housing 1156 to cover any portion of the blade exposed from the housing. A person uses miter saw 1150 by lifting the saw up, placing a workpiece on base 1152, and then bringing the saw down onto the workpiece to cut the workpiece.

Miter saw 1150 also preferably includes a brake pawl 60 in a cartridge 80 configured to stop the spinning of the blade, as described above. A saw blade spinning at several thousand revolutions per minute has substantial angular momentum. Thus, when the brake pawl engages and stops the blade, the angular momentum must be transferred to the brake. Because the swing arm of the miter saw is free to pivot in the direction of blade rotation, the angular momentum of the blade may be transferred to the swing arm when the blade is suddenly stopped, causing the swing arm to swing downward. This sudden and forceful downward movement of the swing arm may cause injury to the user if a portion of the user's body is beneath the blade.

There are many suitable means and mechanism for preventing the sudden downward movement of the swing arm. For example, the pivotal connection between the swing arm and the base of the miter saw may be electrically lockable, for example using an electromagnetic leaf brake, to prevent the arm from pivoting. The signal to lock the connection may be provided by the detection subsystem. While there are many other ways of connecting the swing arm to the base to prevent sudden movement of the arm toward the base, most such arrangements transfer the angular momentum to the swing arm/base assembly. Depending on the weight and balance of the saw, the angular momentum may be sufficient to cause the entire saw to overturn. Therefore, it may be desirable to secure the base to a stable surface with clamps, bolts, etc.

FIG. 4 shows one way to prevent the sudden downward movement of swing arm 1154. Swing arm 1154 includes a cam portion 1170 having a cam surface 1172. Cam portion 1170 may be integral with the swing arm and housing 1156. A stopping pawl 1174 is mounted to vertical support 1104 adjacent cam surface 1172, and an actuator 1176 is positioned adjacent pawl 1174. The actuator 1176 is operatively coupled to the control and detection subsystems associated with brake pawl 60 and cartridge 80 so that when pawl 60 is released, actuator 1176 engages pawl 1174. During normal operation, actuator 1176 maintains the pawl spaced-apart from cam surface 1172. However, once contact between the blade and the user's body is detected, the detection system sends an actuation signal to actuator 1176, which may be the same or a different signal that triggers the release of brake pawl 60. In any event, upon receipt of the actuation signal, the actuator drives against pawl 1174, causing it to pivot into cam surface 1172, preventing further movement of the swing arm. Pawl 1174 may be constructed or coated with a high friction material such as rubber, and/or may be configured with teeth, etc., to increase its braking action. Cam portion 1170 may be modified so that it extends as far as possible from the point around which it pivots, in order to provide as great a moment arm as possible to help stop the downward motion of the swing arm.

The miter saw in FIG. 4 also includes a piston/cylinder 1180 connected between swing arm 1154 and base 1152. That piston/cylinder limits the speed with which the swing arm can pivot relative to the base, and can also serve to stop or limit the downward motion of the blade when accidental contact with the blade is detected.

There are many alternative methods, devices, and configurations for stopping the swing arm from moving down. Any one or more of these alternatives may be used in place of, or in addition to, the pawl and cam configuration illustrated in FIG. 4 and described above. What is important is to provide a mechanical stop to halt the downward motion of the swing arm when the blade contacts a user.

Figure 5:
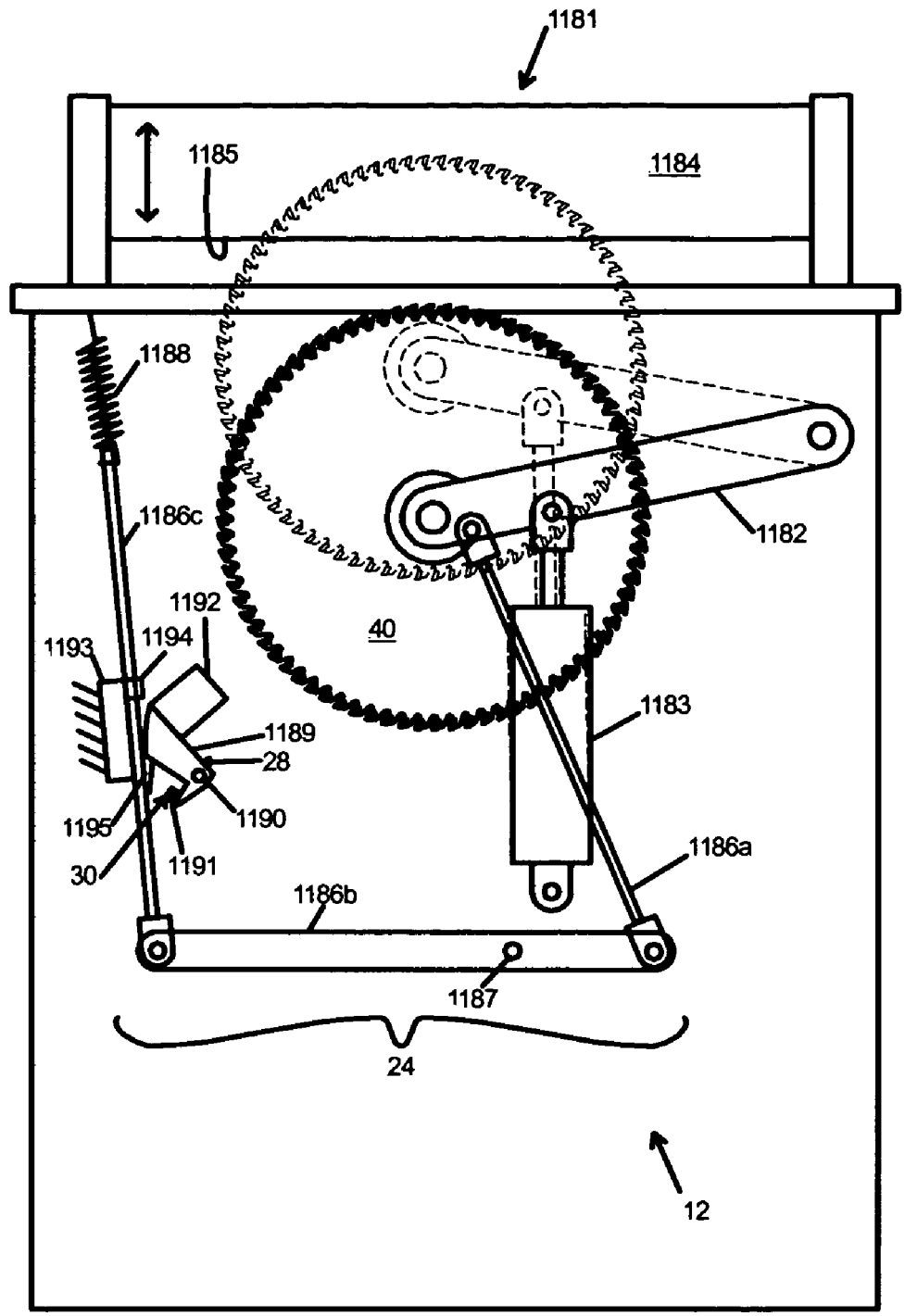
FIG. 5 is a side elevation of a pneumatic cut-off saw equipped with a safety system.

FIG. 5 illustrates an alternative translation stop mechanism implemented in the context of a pneumatic up-cut chop saw 1181. Chop saw 1181 includes a blade 40 mounted to a pivotal arbor block 1182. The blade and/or some associated portion of the saw, are electrically isolated and coupled to a detection system such as described above and in the incorporated references. This arrangement allows detection of contact of the blade with a user as described in those cases.

The arbor block is pivoted to the upward position shown in the dashed lines by an actuating mechanism 1183. In the depicted embodiment, actuating mechanism 1183 takes the form of a pneumatic cylinder. Alternatively, actuating mechanism 1183 may take any other form configured to raise and lower the blade including a hydraulic cylinder, mechanically-driven shaft, etc. Exemplary cylinder 1183 may be actuated by the user, such as by stepping on a foot switch, or may be operated by an electronic controller. In either case, a solenoid valve (not shown) is normally provided to control the delivery of air to the cylinder. A blade guard or guard structure 1184 is provided to cover the blade as it emerges through the top of the table. In many cases the blade guard moves down upon actuation of the saw to serve as a hold down on the material being cut. A defined portion 1185 of the blade guard, such as a metal strip along the bottom of the blade guard, can therefore be electrically isolated and used as an electrode to also detect contact with a user as described above. Because the blade guard is not spinning, it may be desirable to use a conductive or other type of coupling rather than capacitive coupling to detect contact. It will be appreciated that any suitable coupling system can be utilized. In any case, the detection system then monitors for contact between the bottom of the blade guard and a user.

Although not essential, it is preferable that the control subsystem only treat a detected contact as a dangerous condition and trigger the reaction subsystem during actual actuation of the saw. Otherwise, inadvertent contact when the user is positioning stock to be cut may result in false triggers where no danger was present. However, if the bottom of the guard is touching the user at any time during the actuation cycle of the saw, the reaction subsystem should be triggered.

Because the user's hand may be covered by a glove or may be positioned under the board, in most cases it is not sufficient just to use the blade guard for contact detection. Therefore, it usually is desirable to couple the detection subsystem to both the blade guard and the blade. In such case, a user would be protected under all circumstances since the reaction subsystem would be triggered when the blade cut through the glove and/or board and contacted the user's hand.

As an alternative or in addition to monitoring for contact with the blade guard, a defined region or portion of the table of the saw around the blade opening can be isolated and monitored for user contact, just as with the blade guard. For instance a metal strip 2-cm wide with a slot for the blade to pass through can be installed in an insulating material into the portion of the table through which the blade projects. This strip can then serve as a contact detection electrode. Therefore, if a user's hand contacts the electrode on the table, i.e., is on the table within 1-cm of the blade, when the saw is actuated, the reaction subsystem can be triggered. Similar systems can of course be used on many other types of woodworking machinery, such as on the infeed section of a planer, to detect dangerous conditions.

Saw 1181 includes a reaction subsystem 24 configured to interrupt the upward motion of the saw if contact with a user is detected at the guard/table or by the blade. Reaction subsystem 24 includes a first link 1186*a* extending between arbor block 1182 and an end of a lever link 1186*b*. The lever link pivots about a pivot point 1187 and is connected at the opposite end to a second link 1186*c*. The pivot point is positioned so that the second link travels substantially farther than the first link during actuation of the saw. A spring 1188 is connected to the free end of the second link to tension the entire linkage mechanism against upward motion of the saw. This tension, although not essential, is beneficial to insure that any slop in the linkage is already taken up when the brake is actuated, as described below, to thereby minimize upward travel after actuation.

The reaction subsystem also includes a brake mechanism 28 in the form of a pawl 1189. The pawl is mounted on a pivot 1190 and biased toward the second link by a biasing mechanism 30 in the form of a stack 1191 of Belleville springs. The springs are preferably positioned to push the pawl against the pivot in a direction to minimize any slop or play in uptake when the face of the pawl contacts the second link. Again, this reduces the upward movement of the blade after triggering of the brake. A restraining mechanism in the form of an electromagnet 1192 is magnetically connected to the upper side of the pawl to hold the pawl against the biasing mechanism. Typically, the pawl is constructed from a hard, magnetic metal and is provided with serrations on the front surface to grip or bite into the link when engaged. The pawl can also be provided with a magnetic plate attached to the top to engage the electromagnet. A slide surface 1193 is provided opposite the pawl to guide the second link and provide a support for the second link when the pawl pushes against the linkage. A retainer 1194 holds the second link against the slide surface so no play is present when the pawl is actuated and to insure that the link does not accidentally contact the pawl prior to release. The face of the pawl is preferably positioned so that it rides very close—preferably between 0.1 mm and 2 mm—to minimize the time required for engagement with the link.

Under normal conditions, a current is driven through the electromagnet to hold the pawl. Upon actuation of the reaction subsystem, the electrical current is interrupted, and preferably a current of the opposite polarity is applied for a short period of time, to quickly release the pawl to be pushed over into contact with the second linkage by the spring. The pawl then immediately binds against the second linkage to prevent further upward motion of the blade. Simultaneously, the pneumatic cylinder is reversed to begin retraction of the blade. Brake mechanism 28 can stop upward motion of the blade in 1-5 milliseconds and restrain the pneumatic cylinder until the solenoid valve can be reversed to retract the blade. Preferably, the retraction begins in substantially less than 100 milliseconds so that the user does not have time to react and jerk their hand across the still spinning blade, thereby causing more serious injury.

After the brake pawl is released, a shoulder 1195 located on the second link is positioned to reset the pawl against the electromagnet when the blade is fully lowered. When the blade is lowered, the shoulder pushes against the underside of the pawl to lift the pawl back into contact with the electromagnet. This resets the system so that it is ready for repeated use. It should be understood that the electromagnetic release can be used interchangeably with the fusible member release previously described. The fusible member is generally cheaper to implement, but has the disadvantage of being suitable for only a single use.

Figure 6:
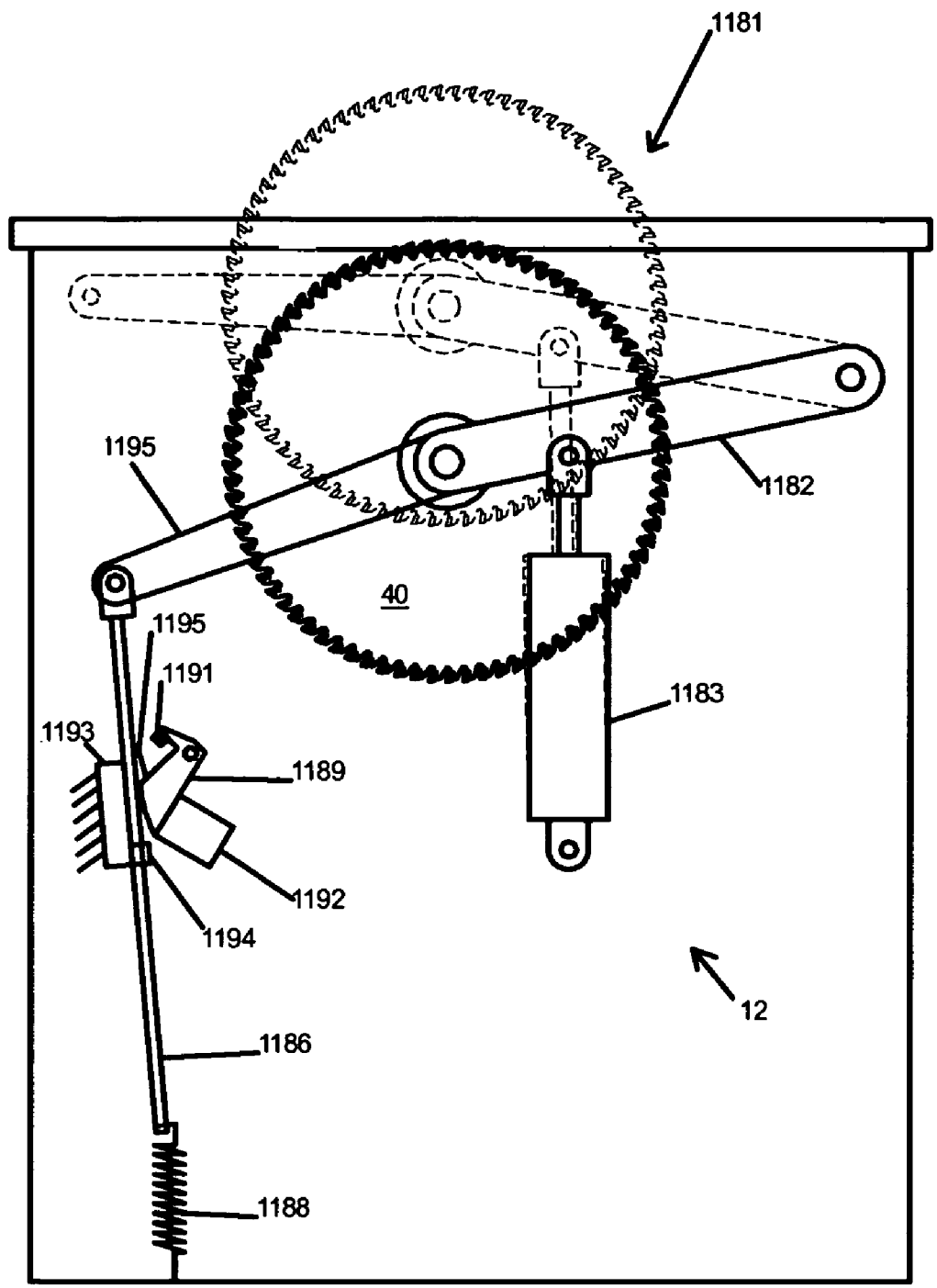
FIG. 6 is a side elevation of a pneumatic cut-off saw equipped with an alternative safety system.

An alternative reaction subsystem configuration to stop translational movement similar to the system of FIG. 5 is shown in FIG. 6. The system of FIG. 6 includes only a single link 1186 connected to an extension arm 1195 connected to arbor block 1182. The extension arm provides some mechanical advantage, similar to the lever link of FIG. 5. When the reaction subsystem is actuated, pawl 1189 grips link 1186 as previously described to stop upward movement of the blade. As before, spring 1188 maintains a tension on the link to take up any play that may be present or develop in the mechanism. It should be understood that the system of FIGS. 5 and 6 could be used together to create additional mechanical advantage in the translation stopping mechanism.

Figure 7:
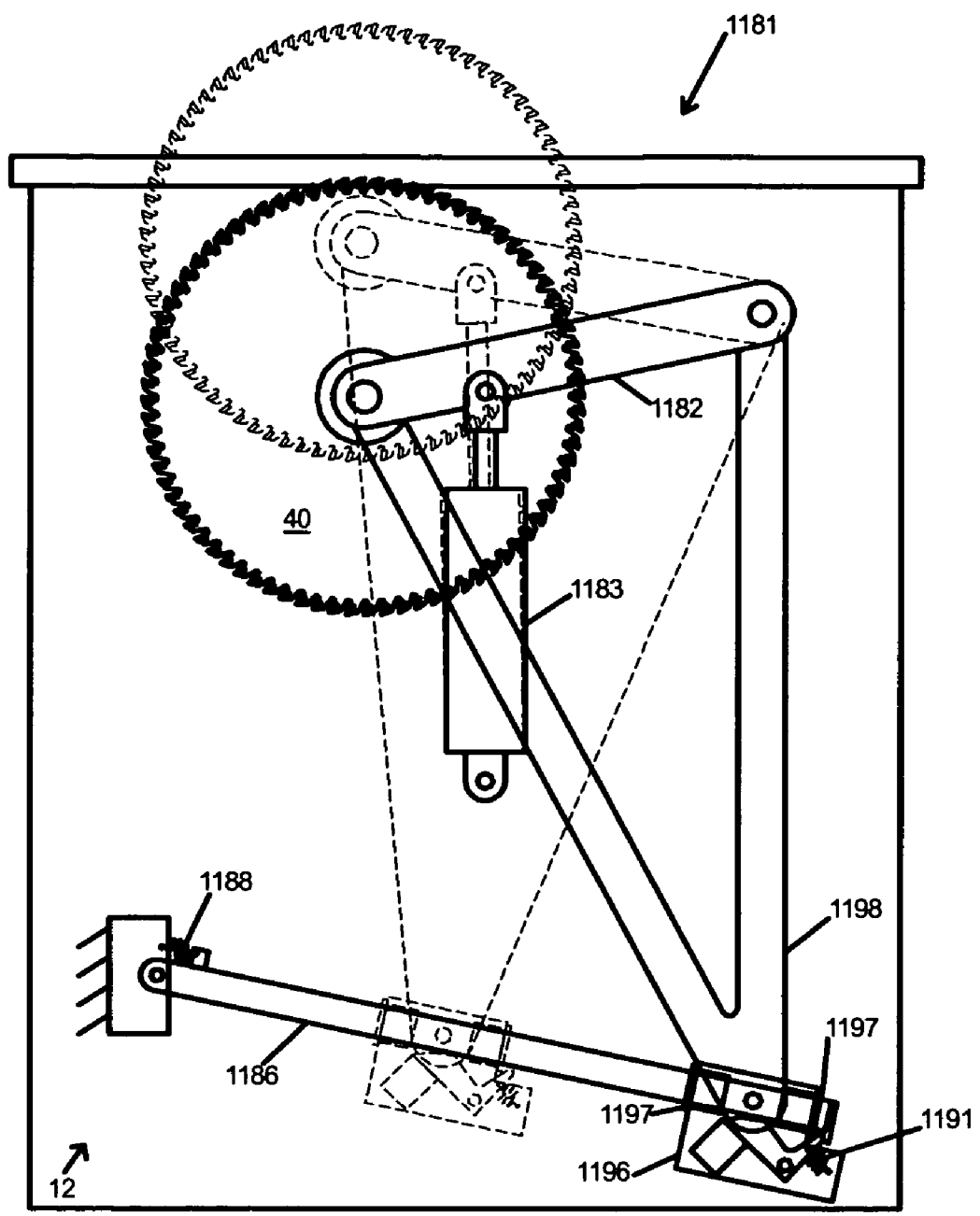
FIG. 7 is a side elevation of a pneumatic cut-off saw equipped with a second alternative safety system.

FIG. 7 illustrates another reaction subsystem similar to those of FIGS. 5 and 6. In the reaction subsystem of FIG. 7, the brake is mounted on a carriage 1196, which slides along link 1186 on bushing 1197. The carriage is mounted to a brace 1198 that is coupled to arbor block 1182 to pivot therewith. As the arbor block pivots upwardly, the carriage is driven along the link. When contact is detected, the pawl is released to catch against the surface of the link and stop the upward travel of the blade. As described above, springs 1188 and 1191 are positioned to eliminate any play in the translation stop mechanism.

Figure 8:
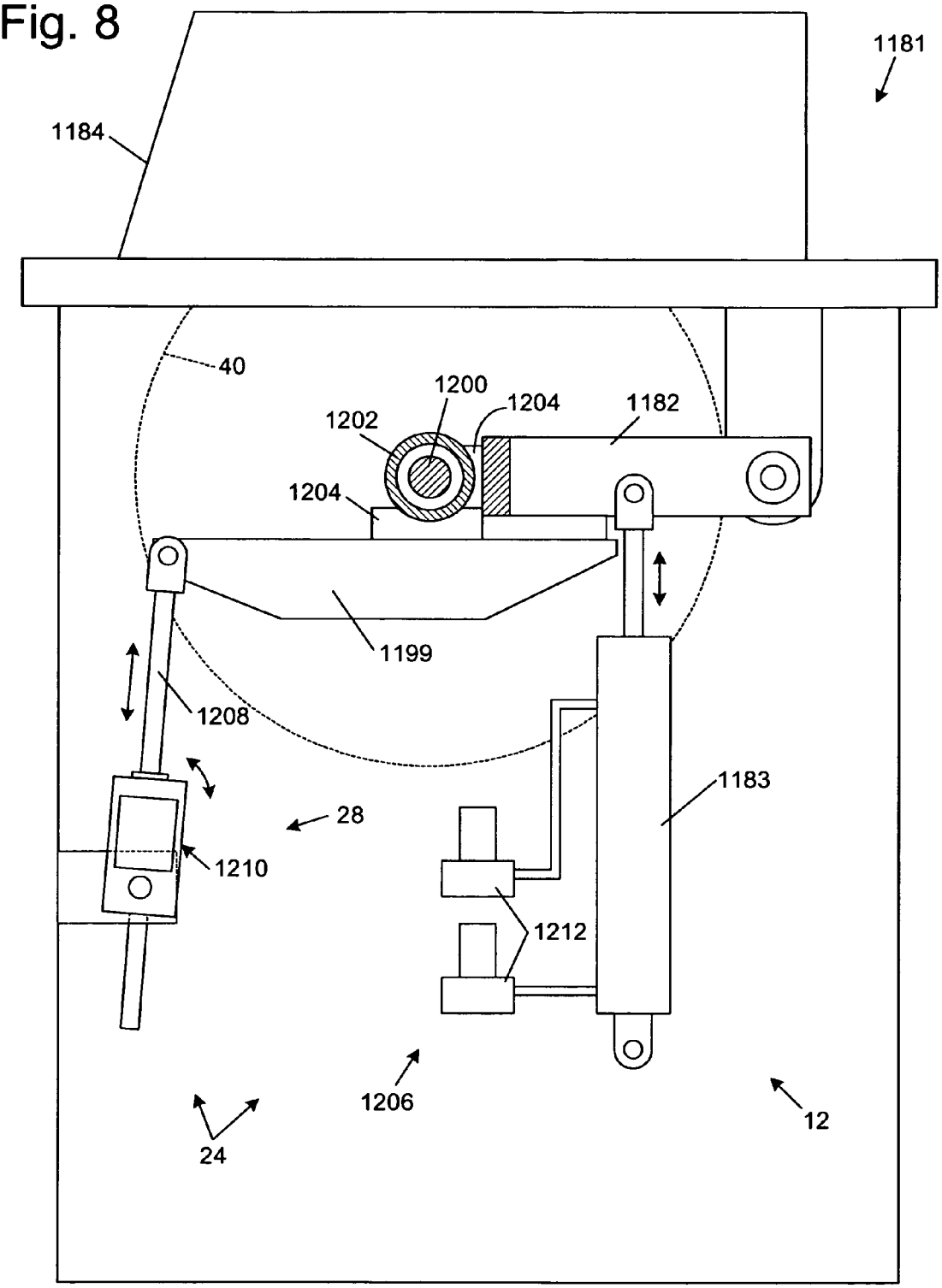
FIG. 8 is a side elevation of a pneumatic cut-off saw equipped with a third alternative safety system.

FIG. 8 illustrates a further alternative configuration of reaction subsystem 24 adapted for use on a pneumatic up-cut chop saw 1181 to stop the upward movement of blade 40 and then retract the blade. As can be seen, the blade is mounted on an arbor or spindle 1200 supported within a spindle housing 1202 by one or more bearings (not shown). The spindle housing is electrically isolated from arbor block 1182, extension arm 1199 and the remainder of chop saw. 1181 by spacer blocks 1204. The spacer blocks may be constructed of phenolic or some other electrically-insulating material.

With spindle housing 1202 electrically isolated from the remainder of saw 1181, the detection subsystem (not shown) may be coupled directly to the spindle housing. The relative close spacing between spindle 1200 and the spindle housing creates a capacitive coupling between the spindle housing and the spindle. Additionally, the spindle and spindle housing may also be conductively coupled through the bearings. In any event, blade 40 is coupled to the spindle housing and the detection subsystem through the spindle.

Reaction subsystem 24 includes a brake mechanism 28 and a retraction mechanism 1206. Brake mechanism 28 includes a brace member 1208 pivotally coupled to the end of extension arm 1199. A locking assembly 1210 is pivotally coupled to a portion of the chop saw frame. Locking assembly 1210 is configured to receive and slide along brace member 1208 as the brace member moves up and down with arbor block 1182 and extension arm 1199. Upon receipt of an activation signal, locking assembly 1210 is configured to quickly clamp onto the brace member and prevent further upward movement of the brace member. As a result, upward movement of the blade is also stopped.

Simultaneous with the activation of brake mechanism 28, retraction mechanism 1206 is configured to retract the blade to its lowermost position below the table top. Preferably, locking assembly 1210 is configured to prevent only upward movement of brace member 1208 so that retraction mechanism 1206 is able to move the blade downward after the brake mechanism has been activated. Alternatively, the locking assembly may be configured to release the brace member once the retraction mechanism begins urging the arbor block downward. In the exemplary embodiment depicted in FIG. 8, retraction mechanism 1206 includes a pair of pneumatic solenoid valves 1212 adapted to reverse the direction of pneumatic cylinder 1183 in response to the activation signal. Alternatively, retraction mechanism 1206 may include any other suitable mechanism adapted to urge blade 40 downward.

Figure 9:
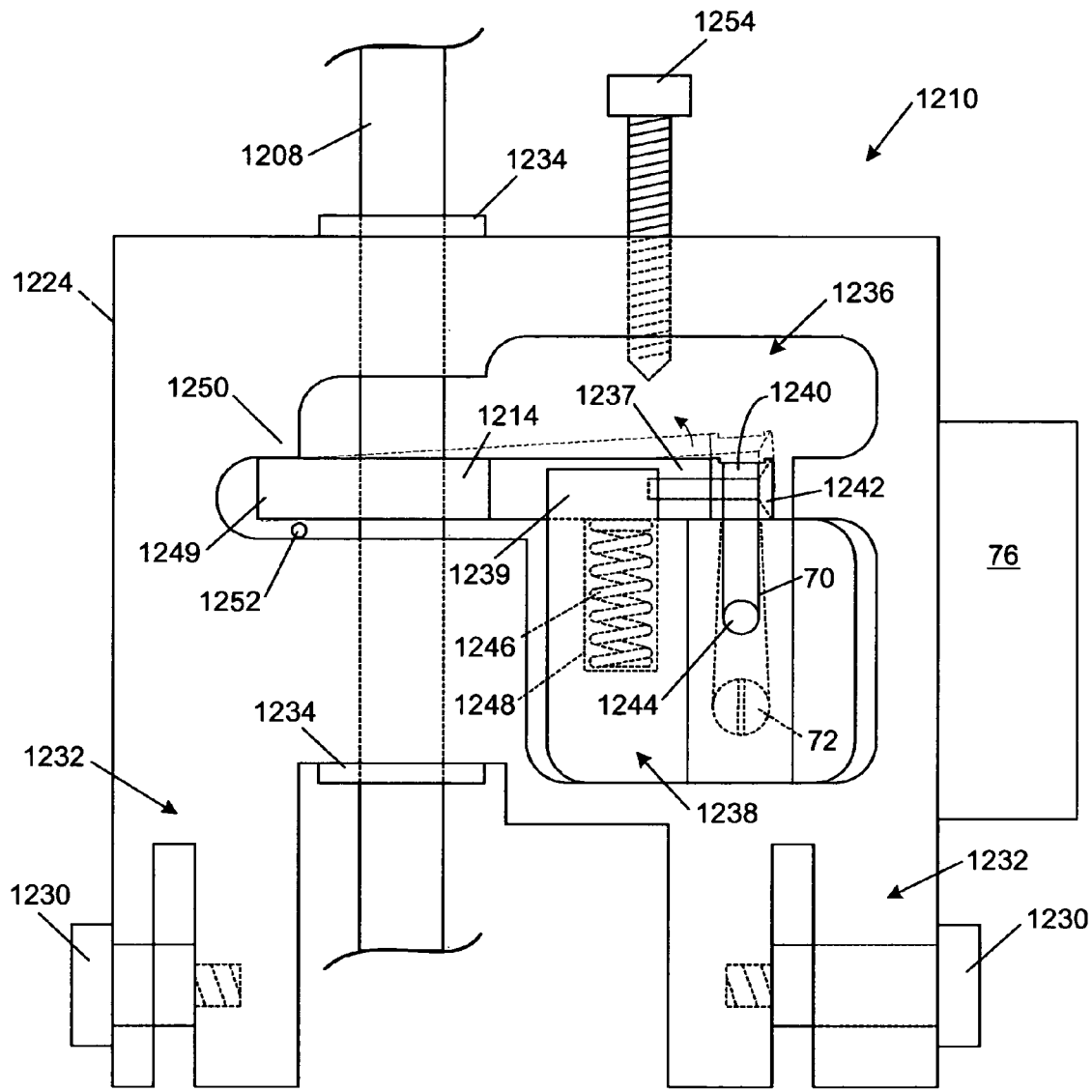
FIG. 9 is a magnified view of an exemplary locking assembly for use in the safety system of FIG. 8.
Figure 10:
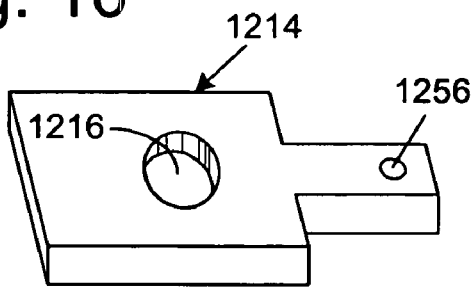
FIG. 10 is an isometric view of a clamping device for use in the locking assembly of FIG. 9.

It will be appreciated that locking assembly 1210 may be configured in any of a variety of different ways to quickly clamp onto brace member 1208 and stop upward movement of the blade. In the exemplary embodiment depicted in FIG. 9, the locking assembly includes a clamping device 1214 adapted to slide along and selectively bind against brace member 1208. As shown in FIG. 10, clamping device 1214 includes an orifice 1216 adapted to receive and slide along brace member 1208 when the orifice is substantially axially aligned with the brace member. However, when clamping device 1214 is pivoted relative to the brace member (as indicated by dash lines in FIG. 9), the edges of orifice 1216 bind against and lock-up on the sides of the brace member.

Brace member 1208 and clamping device 1214 may be constructed from any of a variety of different materials having either the same or different hardnesses. For example, the clamping device may be formed from hardened steel while the brace member is formed from unhardened steel, or vice versa. Alternatively, both the clamping device and brace member may be formed of unhardened steel or hardened steel. Furthermore, the brace member and/or the clamping device may include structure (e.g., serrations, etc.) adapted to enhance the friction or gripping action of the clamping device on the brace member. Additionally, one or both of brace member 1208 and clamping device 1214 may be formed of different materials. In the exemplary embodiment, brace member 1208 is formed of unhardened O1 steel drill rod with a smooth surface, while clamping device 1214 is formed of oil hardened steel. Forming the clamping device from a harder material than the brace member allows the clamping device to slightly deform or 'bite into' the brace member during braking.

Figure 11:
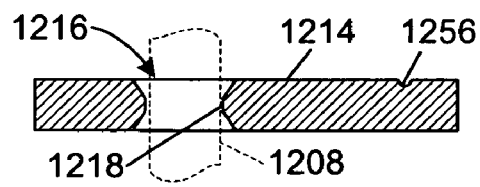
FIG. 11 is a cross-sectional view showing an alternative clamping device.
Figure 12:
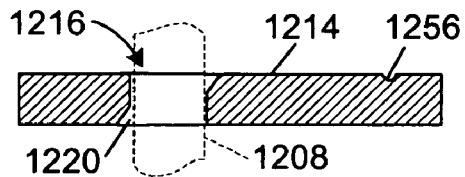
FIG. 12 is a cross-sectional view showing another alternative clamping device.
Figure 13:
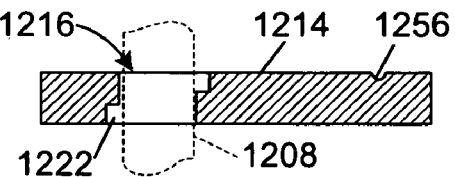
FIG. 13 is a cross-sectional view showing another alternative clamping device.

Orifice 1216 typically is sized to fit relatively closely about brace member 1208. In the exemplary embodiment for example, the brace member has a diameter of approximately 0.500-inch, while the orifice has a diameter in the range of approximately 0.500-inch to approximately 0.503-inch. Alternatively, the orifice may be any size or shape adapted to bind against the brace member. The sides of orifice 1216 may be substantially cylindrical so that the opposite edges of the orifice form gripping edges that bind against the brace member. Alternatively, the sides of the orifice may be shaped to bind against the brace member at locations between the opposite edges of the orifice. For example, FIGS. 11-12 illustrate alternative orifice configurations adapted to present different gripping edges on the sides of the brace member. In FIG. 11, the sides of orifice 1216 present generally conical surfaces having flat apexes 1218 facing inward toward the brace member. The width of the apexes may be varied to select the axial distance between gripping edges. As shown in FIG. 12, opposing sides of the orifice may have beveled regions 1220 extending in opposite directions to reduce the axial distance between gripping edges within the orifice. Similarly, as shown in FIG. 13, opposing sides of the orifice may have offset regions 1222 extending in opposite directions to reduce the axial distance between gripping edges within the orifice. It will be appreciated that the orifice configuration typically is selected to achieve the quickest lock-up on the brace member, and may depend on the relative sizes, shapes and/or hardnesses of the brace member and clamping device.

Exemplary locking assembly 1210 also includes a housing 1224 adapted to support the clamping device in a constant orientation relative to the brace member until the activation signal is received. The housing may be pivotally coupled to chop saw 1181 by one or more shoulder bolts 1230 adapted to engage mounting structures 1232 on the housing. The housing includes one or more bushings 1234 or similar structures configured to receive and slide along the brace member. Bushings 1234 fit relatively closely about the brace member to maintain housing 1224 in a constant orientation relative to the brace member as the brace member slides within the housing.

Clamping device 1214 is mounted in a cavity 1236 formed within housing 1202 and positioned so that orifice 1216 is axially aligned with the brace member when the brace member is received within the housing. Prior to actuation, one end 1237 of clamping device 1214 is positioned against a support base 1238 disposed within cavity 1236. Support base 1238 includes a pair of guide structures 1239 adapted to fit on either side of end 1237 and generally align the clamping device within the housing. The clamping device is held in place against support base 1238 by a fusible member 70 extending over an electrically-insulating stud 1240 mounted on end 1237 by a screw 1242 or similar mechanism. Stud 1240 may be constructed of phenolic or some other electrically-insulating material, and serves to insulate clamping device 1214 from any electric charge present on the fusible member. Alternatively, fusible member 70 may be positioned in direct contact with the clamping device. In any event, fusible member 70 is anchored at one end to a mounting post 1244, and at the other end to a contact mount 72 such as described above. Contact mount 72 is coupled to a firing subsystem 76 disposed on or near housing 1224. As described above, the firing subsystem applies a sudden current surge to contact mount 72 in response to an activation signal, thereby melting fusible member 70 and releasing clamping device 1214. Upon release from fusible member 70, end 1237 is urged upward by a suitable biasing mechanism such as a compression spring 1246. Support base 1238 includes a hole 1248 adapted to receive the spring and sized so that the spring is held in compression when clamping device 1214 is positioned against the support base.

The other end 1249 of clamping device 1214 abuts against a shelf structure 1250 defined by cavity 1236. The shelf structure is positioned relative to support base 1238 so that orifice 1216 is aligned to slide along the brace member when the clamping device is held against the support base. Once the clamping device is released, end 1237 is urged upward while end 1249 is held against shelf structure 1250. Thus, clamping device 1214 pivots relative to the brace member until the edges of orifice 1216 bind against the brace member. Any additional upward force on the brace member relative to the clamping device tends to increase the locking grip of the clamping device on the brace member. Thus, further upward movement of the brace member relative to the housing is prevented. Optionally, a pin 1252 or similar structure may be positioned beneath end 1249 to ensure the clamping device pivots in the opposite direction to return to an unlocked orientation when the brace member moves downward relative to the housing.

In the exemplary embodiment, locking assembly 1210 also includes a bolt 1254 threaded through housing 1224 above clamping device 1214. Bolt 1254 may be screwed into the housing to cock or push the clamping device into its unactuated position on support base 1238 against the bias of spring 1246. Optionally, the clamping device may include a depression 1256 adapted to receive the lower end of bolt 1254. This allows a user to automatically align the clamping device relative to the brace member using bolt 1254. Once a new fusible link is installed, bolt 1254 is screwed out to ensure the clamping device has sufficient clearance to pivot into binding engagement with the brace member. Alternatively, a different mechanism may be used to cock the clamping device against the bias of spring 1246.

It will be appreciated that exemplary locking assembly 1210 may be used with any of the embodiments described above. Additionally, many modifications and variations of locking assembly 1210 are possible. Several examples of alternative locking assemblies are described in U.S. Provisional Patent Application Ser. No. 60/270,941, filed Feb. 22, 2001, and U.S. Provisional Patent Application Ser. No. 60/270,942, filed Feb. 22, 2001, the disclosures of which are herein incorporated by reference.

Figure 14:
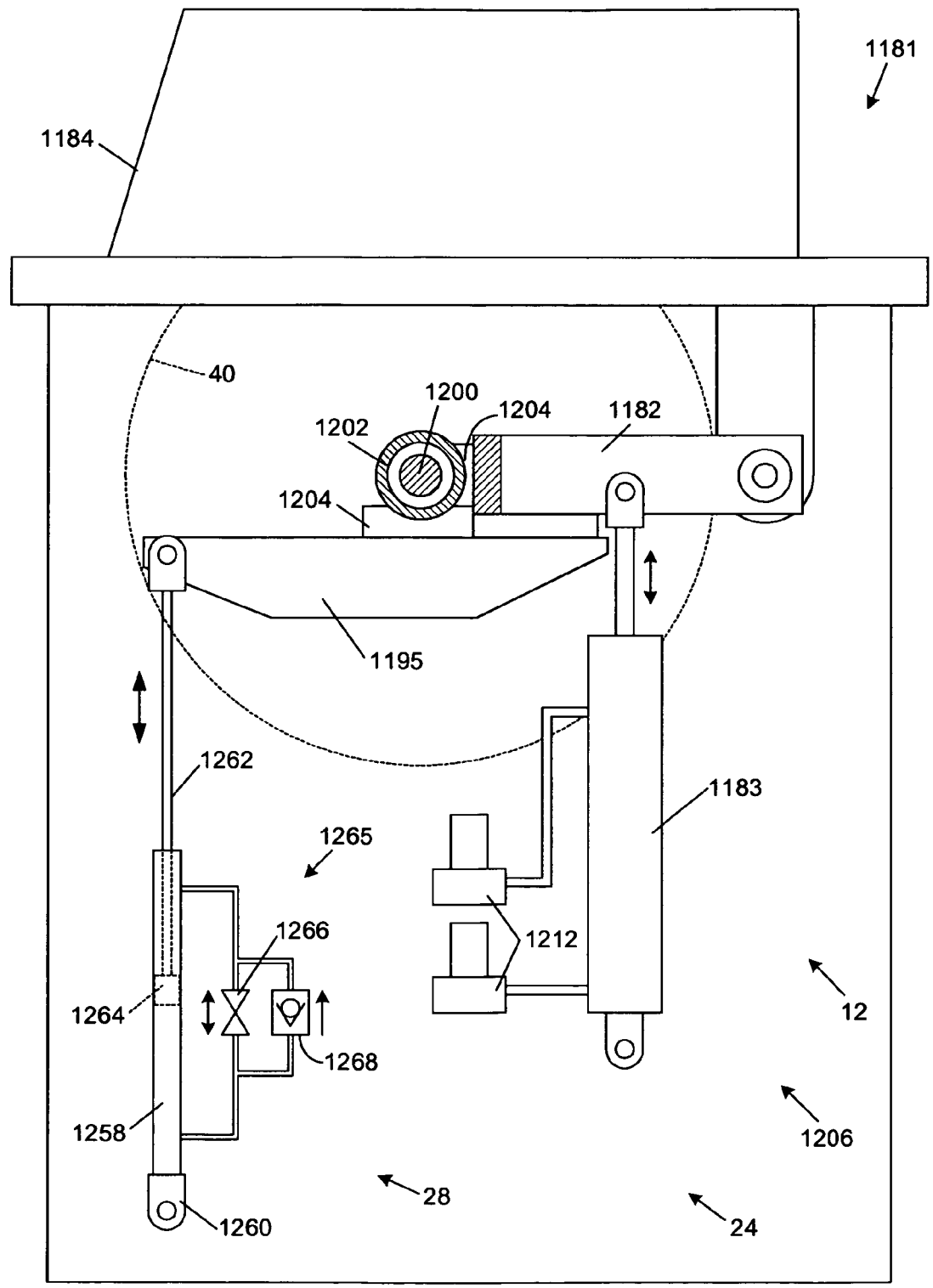
FIG. 14 is a side elevation of a pneumatic cut-off saw equipped with a fourth alternative safety system.

Another alternative configuration of reaction subsystem 24 adapted for use on a pneumatic up-cut chop saw 1181 is illustrated in FIG. 14, in which brake mechanism 28 takes the form of a hydraulic cylinder 1258. A lower portion 1260 of cylinder 1258 is pivotally coupled to the frame of chop saw 1181 or some other suitable support structure. The hydraulic cylinder includes an extension rod 1262 slidably extending from the top of the cylinder. The upper end of the extension rod is pivotally coupled to extension arm 1195. The lower end of extension rod 1262 is coupled to a piston 1264 housed to slide within cylinder 1258. As blade 40 is raised and lowered during normal operation of chop saw 1181, extension rod 1262 moves up and down, thereby pulling and pushing piston 1264 up and down within cylinder 1258.

Brake mechanism 28 also includes a hydraulic control circuit 1264 adapted to regulate the flow of hydraulic fluid within cylinder 1258. Control circuit 1264 and cylinder 1258 form a closed hydraulic system. Under normal operating conditions, the hydraulic control circuit forms a fluid channel between the top and bottom of cylinder 1258. When the blade is pushed upward by pneumatic cylinder 1183, extension rod 1262 pulls piston 1264 upward. As a result, hydraulic fluid is pushed out of the top of cylinder 1258, through the control circuit and into the bottom of the cylinder. Conversely, when the blade is pushed downward, extension rod 1262 pushes piston 1264 downward, thereby pushing hydraulic fluid from the bottom of the cylinder, through the control circuit to the top of the cylinder.

As shown in FIG. 14, control circuit 1264 includes a two-way control valve 1266 and a one-way check valve 1268. Control valve 1266 is operable by the control system (not shown) to open or close a bi-directional channel between the top and bottom of cylinder 1258. When a dangerous condition is detected, the control system is configured to close valve 1266, thereby closing the hydraulic channel from the top of the cylinder to the bottom of the cylinder is closed. As a result, piston 1264 is prevented from moving further upward in the cylinder and the upward movement of the blade is stopped. Typically, the hydraulic fluid selected for use in cylinder 1264 is a relatively non-compressible fluid such as oil, etc., to minimize the distance piston 1264 moves upward after valve 1266 has closed. Check valve 1268 provides a continuous, uni-directional channel from the bottom of cylinder 1258 to the top. Thus, piston 1264 is able to move downward in the cylinder even though control valve 1266 is closed. This allows retraction mechanism 1206 to pull the blade downward upon detection of a dangerous condition. While one exemplary hydraulic control circuit has been shown and described, it will be appreciated by those of skill in the art that the control circuit may be configured in many different ways to achieve the desired operation.

Figure 15:
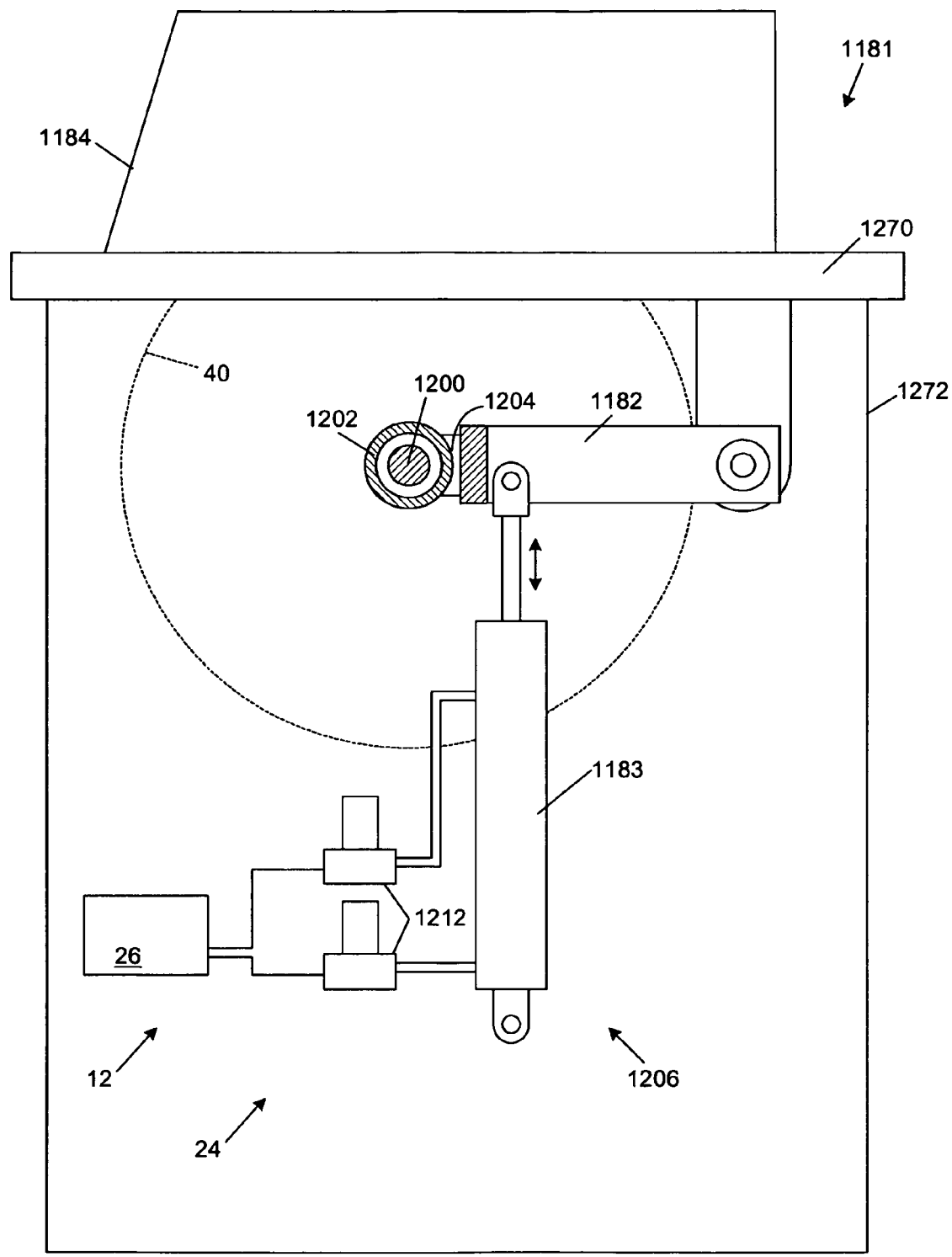
FIG. 15 is a side elevation of a pneumatic cut-off saw equipped with a fifth alternative safety system FIG. 16 a front elevation of the pneumatic cut-off saw of FIG. 15 with a portion of the operative structure indicated in dash line.
Figure 16:
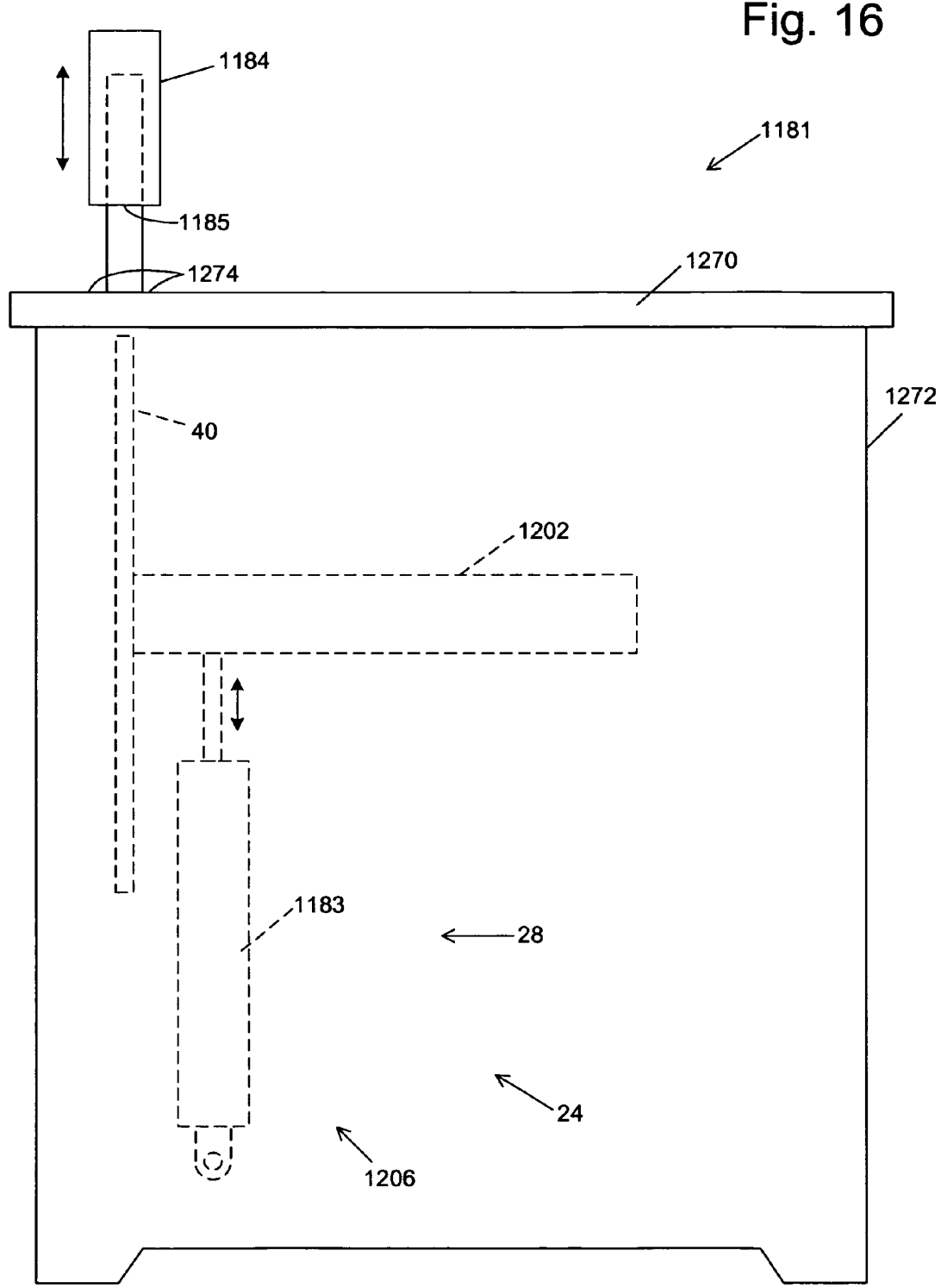

In the exemplary embodiments depicted in FIGS. 5-14, reaction subsystem 24 includes a brake mechanism 28 that is separate from the actuating mechanism that raises and lowers the blade. However, reaction subsystem 24 may alternatively be configured to stop the upward movement of the blade without the use of a separate brake mechanism. For example, FIGS. 15 and 16 illustrate an exemplary embodiment in which actuating mechanism 1183 also functions as the brake mechanism. As shown, exemplary actuating mechanism 1183 takes the form of a pneumatic or hydraulic cylinder. The actuating mechanism is configured to be controlled by control subsystem 26. Upon detection of a dangerous condition, the control subsystem causes the cylinder to retract, thereby stopping any upward motion of the blade and retracting the blade below the table 1270 of the chop saw frame 1272. If the cylinder is already retracted when the dangerous condition is detected, the control subsystem prevents actuation of the cylinder.

In the exemplary embodiment, the detection subsystem (not shown) is configured to detect several dangerous conditions including, contact between the user and a defined portion 1185 of guard structure 1184, contact between the user and a defined portion 1274 of table 1270, and contact between a user and blade 40, etc. Alternatively, the detection subsystem may be configured to detect fewer or more dangerous conditions. In any event, if any of these dangerous conditions are detected, the control subsystem sends a signal to the reaction subsystem, i.e., cylinder 1183, and stops any upward movement of the blade by reversing the motion of cylinder 1183, and then retracts the cylinder to retract the blade below the top surface of table 1270. Preferably, cylinder 1183 is configured to reverse and retract quickly relative to the speed with which the cylinder moves the blade upward. This helps ensure that any injury to a user is minimal.

If cylinder 1183 is controlled by an electromagnetic solenoid valve, it may be desirable to use a relatively high voltage signal to actuate the valve so as to cause the valve to switch as quickly as possible. For example, a 180-volt DC pulse transmitted to a solenoid valve that nominally switches with a 24-volt DC pulse will typically cause the valve to switch at or near a maximum switching speed. The high voltage pulse may be supplied from a firing subsystem such as described above, including one or more charge storage devices such as capacitors, etc. Various suitable firing subsystems are described in the incorporated references.

It should be noted that different chop saws have different actuating mechanisms, such as cams, eccentrics, etc., to raise and lower the blade and the above-described safety systems and variations thereof can be applied to such different mechanisms as well. The reaction subsystems described above can also be used in connection with various other braking or blade retraction systems to obtain combined benefit. For instance, the blade may be braked at the same time as the upward movement of the blade is stopped and reversed to further minimize the chance of serious injury.

While several exemplary embodiments of machine 10 and safety system 18 have been described above, it will be appreciated by those of skill in the art that many variations and modifications are possible. Examples of just a few of the possible variations and modifications of the components safety system 18, which are suitable or may be adapted for use with the machines described above, are described in the incorporated references. Additionally, the systems and components described herein may be adapted for use on a variety of other saws. Several examples of such other saws, as well as further detailed descriptions of safety systems, components, miter saws, radial arm saws and chop saws may be found in the following patent applications, the disclosures of which are incorporated herein by reference: U.S. patent application Ser. No. 09/676,190, filed Sep. 29, 2000; PCT Patent Application Serial No. PCT/US00/26812, filed Sep. 29, 2000; U.S. Provisional Patent Application Ser. No. 60/157,340, filed Oct. 1, 1999; U.S. Provisional Patent Application Ser. No. 60/225,057, filed Aug. 14, 2000; U.S. Provisional Patent Application Ser. No. 60/225,058, filed Aug. 14, 2000; U.S. Provisional Patent Application Ser. No. 60/225,210, filed Aug. 14, 2000; U.S. Provisional Patent Application Ser. No. 60/273,177, filed Mar. 2, 2001; U.S. Provisional Patent Application Ser. No. 60/273,178, filed Mar. 2, 2001; U.S. Provisional Patent Application Ser. No. 60/273,902, filed Mar. 6, 2001; U.S. Provisional Patent Application Ser. No. 60/275,583, filed Mar. 13, 2001; U.S. Provisional Patent Application Ser. No. 60/275,594, filed Mar. 13, 2001; U.S. Provisional Patent Application Ser. No. 60/275,595, filed Mar. 13, 2001; U.S. Provisional Patent Application Ser. No. 60/279,313, filed Mar. 27, 2001; and U.S. Provisional Patent Application Ser. No. 60/292,100, filed May 17, 2001.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A method of operating an up-cut chop saw, where the saw includes a work surface adapted to support a workplace, a spinnable blade configured to cut a workpiece on the work surface by moving from below the work surface to at least partially above the work surface, a motor to spin the blade, an actuation device to trigger the blade to move upward, a detection system adapted to detect a dangerous condition between a person and the blade by imparting a signal to the blade, where the signal has one or more associated characteristics, and monitoring at least one or more of the associated characteristics for a predetermined rate of change indicative of the dangerous condition, and a reaction system adapted to mitigate possible injury if the detection system detects the dangerous condition, where the saw includes a power switch to supply power to the detection system, the method comprising:

turning on the switch to supply power at least to the detection system, whereupon the detection system then imparts the signal to the blade and starts monitoring at least one or more of the associated characteristics for the predetermined rate of change indicative of the dangerous condition;

supplying power to the motor to spin the blade;

placing a workpiece on the work surface;

operating the actuation device to trigger the blade to start moving upward from below the work surface toward a position at least partially above the work surface; and if the predetermined rate of change is detected, then triggering the reaction system to mitigate possible injury.

2. The method of claim 1, where the dangerous condition is contact between a person and the blade.

3. The method of claim 1, where the dangerous condition is proximity between a person and the blade.

4. The method of claim 1, where the reaction system decelerates the blade.

5. The method of claim 4, where the reaction system decelerates the blade by moving a brake into contact with the blade.

6. The method of claim 1, where the reaction system retracts the blade.

7. The method of claim 1, where the reaction system stops the upward movement of the blade.

8. The method of claim 1, where the limitation of supplying power to the motor occurs only if the detection system is imparting the signal to the blade.

9. The method of claim 1, where the limitation of supplying power to the motor occurs only if the detection system is monitoring at least one or more associated characteristics.

10. The method of claim 1, where the saw includes a second switch to supply power to the motor, and where the limitation of supplying power to the motor occurs by turning on the second switch.

11. The method of claim 1, where the actuation device moves the blade with a fluid-actuated cylinder.

12. The method of claim 1, where the reaction system retracts the blade with a fluid-actuated cylinder.

13. The method of claim 1, where the one or more associated characteristics comprise amplitude of the signal.

* * * * *